United States Patent
Honjo et al.

(10) Patent No.: US 7,130,147 B2
(45) Date of Patent: Oct. 31, 2006

(54) MAGNETIC RECORDING/REPRODUCING APPARATUS

(75) Inventors: Kenichi Honjo, Osaka (JP); Yoshikazu Kato, Osaka (JP); Haruo Isaka, Kyoto (JP); Toshiyuki Kori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/268,783

(22) Filed: Nov. 8, 2005

(65) Prior Publication Data

US 2006/0056102 A1    Mar. 16, 2006

Related U.S. Application Data

(62) Division of application No. 10/476,192, filed as application No. PCT/JP02/05589 on Jun. 6, 2002, now abandoned.

(30) Foreign Application Priority Data

Jun. 12, 2001    (JP)    ............................... 2001-176592

(51) Int. Cl.
*G11B 5/584*    (2006.01)
*G11B 15/467*    (2006.01)

(52) U.S. Cl. .................................................. 360/77.15

(58) Field of Classification Search ...................... None
See application file for complete search history.

(56) References Cited

U.S. PATENT DOCUMENTS 4,868,692 A    9/1989    Nakase et al. ........ 360/77.13 X
5,212,603 A    5/1993    Hasegawa ............ 360/77.14 X
5,325,246 A    6/1994    Guisinger et al.
5,959,799 A    9/1999    Deoka ................. 360/77.13 X
6,185,062 B1   2/2001    Nonoyama ............... 360/77.15

FOREIGN PATENT DOCUMENTS

| JP | 55-150129 | 11/1980 |
|---|---|---|
| JP | 61-3348 | 1/1986 |
| JP | 4-69848 | 3/1992 |
| JP | 5-290456 | 11/1993 |
| JP | 7-29256 | 1/1995 |
| JP | 11-134742 | 5/1999 |
| JP | 11-185324 | 7/1999 |

OTHER PUBLICATIONS

International Search Report corresponding to application No. PCT/JP02/05589 dated Jul. 9, 2002.

*Primary Examiner*—Hoa T. Nguyen
*Assistant Examiner*—James L Habermehl
(74) *Attorney, Agent, or Firm*—RatnerPrestia

(57) ABSTRACT

A sync signal time difference detection circuit detects a time difference of reproduced sync signals reproduced by a first head and a second head having different azimuth angles. Rotation of a capstan motor is controlled in accordance with sync signal time difference information output from the sync signal time difference detection circuit, thereby performing a highly accurate tracking control not affected by jitter or eccentricity.

2 Claims, 25 Drawing Sheets

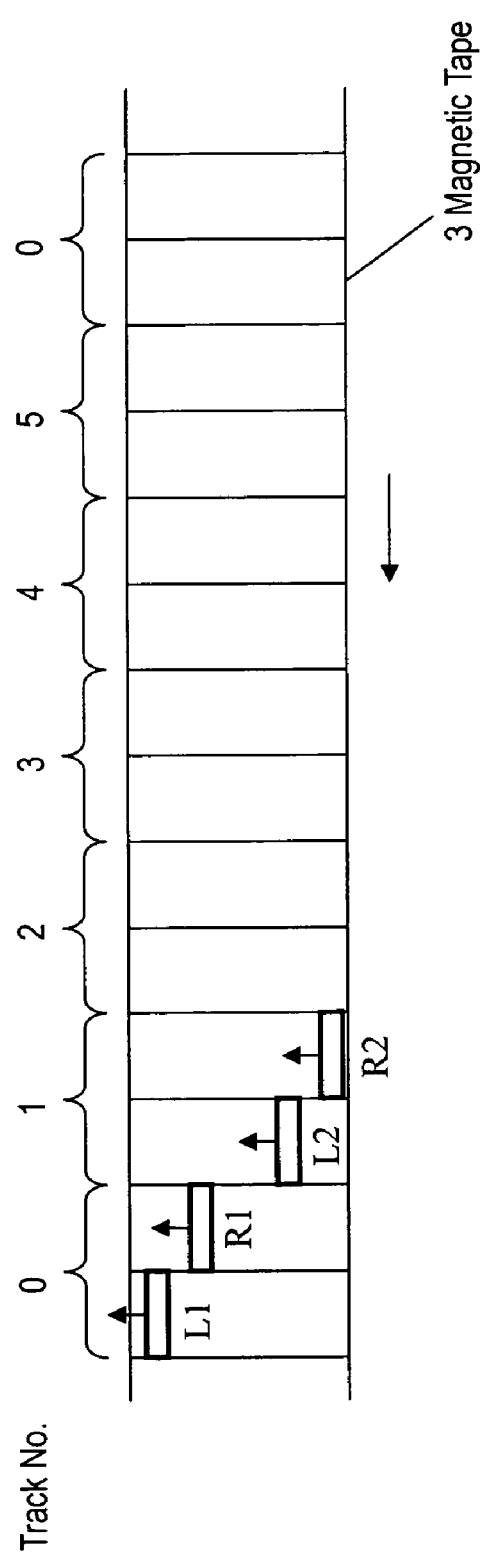

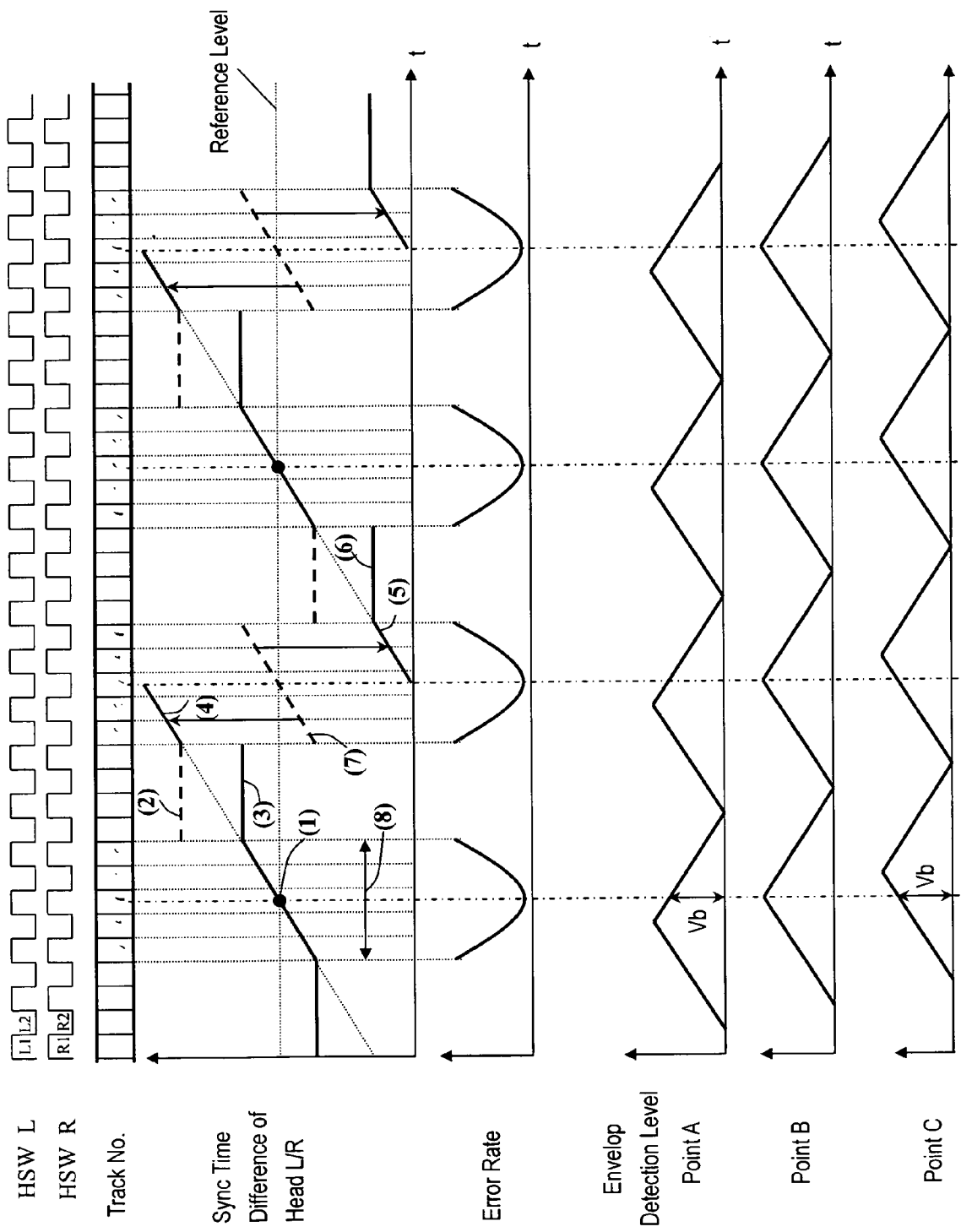

Fig. 25

Equation 25A  Tape Still Speed $$Vo = 2 \times \pi \times R \times N$$

Equation 25B  Track Angle $$\theta t = \tan^{-1}\left(\dfrac{Vo \times \sin\theta L}{Vo \times \cos\theta L - Vt}\right)$$

Equation 25C  Head-Tape Relative Speed $$Vht = \dfrac{Vo \times \sin\theta L}{\sin\theta t} = 2 \times \pi \times R \times \beta$$

Equation 25D  Head-Tape Relative Speed After Expansion $$Vht' = \dfrac{Vo' \times \sin\theta L}{\sin\theta t} = 2 \times \pi \times (R + \Delta t) \times \beta$$

Equation 25E  Distance X by Thermal Expansion $$X = 4 \times Y \times \left(\dfrac{R + \Delta r}{R} - 1\right)$$

Equation 25F  Time Difference according to Distance X $$Tx = \dfrac{X}{Vht'} = \dfrac{4 \times Y}{Vht} - \dfrac{4 \times Y}{Vht'}$$

θL: Lead Angle of Rotary Drum (deg)
N: Rotaion of Rotary Drum (rpm)
R: Radius of Rotary Drum (m)
Δr: Change of Radius of Rotary Drum (m)
Vt: Tape Speed (m/s)
Y: Distance of One Sync Signal on Tape (m)

Formulae 30

MAGNETIC RECORDING/REPRODUCING APPARATUS

This application is a divisional of U.S. patent application Ser. No. 10/476,192, filed Oct. 28, 2003, which is a U.S. National Phase Application of PCT International Application PCT/JP2002/05589, Jun. 6, 2002 the entire disclosure of which are incorporated herein by reference.

FIELD OF THE INVENTION

The present invention relates to a magnetic recording/reproducing apparatus for recording and reproducing data signals with a rotary magnetic head to form a track oblique to a longitudinal direction of a magnetic tape.

BACKGROUND OF THE INVENTION

In a magnetic recording/reproducing apparatus for recording and reproducing data signals with high density on and from a magnetic tape, a helical-scan recording method is employed using a rotary magnetic head (hereinafter referred to as "head"). The data signals are divided and recorded on a group of sequential unconnected slant tracks that are oblique to a longitudinal direction of the magnetic tape. A tracking control is performed to keep the head to follow the tracks during reproduction of the recorded data signals.

Conventional tracking control techniques using a control data obtained from a rotary head include, for instance, an ATF control method disclosed in the Television Technology, September 1985 edition, page 25–27, and a timing control method disclosed in Japanese Patent Laid-Open Publication No. 07-29256, page 3. In the ATF control method, a pilot signal is recorded either in a burst-like manner on a part of a track, or superposed on a data signal, and this pilot signal is used to perform the tracking control at the time of reproduction.

In the timing control method, the tracking control is performed using a tracking error data detected from a time difference between a rotation phase signal of a rotary drum (hereinafter referred to as "PG signal") and a timing signal (hereinafter referred to in this invention as "synchronizing signal") recorded on a track.

With the above-cited ATF control method, the data becomes redundantly long because it needs to record the pilot signal beside a data signal, and it makes worse the tracking accuracy due to residual pilot signal not completely erased on the track base when another data signal is overwritten.

In the timing control method, a difference in timing from a PG signal to a synchronizing signal recorded on a track is likely to receive an influence of irregular rotation of the rotary drum, vibration of the magnetic tape (hereinafter referred to as "jitter" of the rotary drum) and so forth, that also make worse the tracking accuracy.

With an advancement of high-density digital recording in recent years, it has become important to enhance accuracy of tracking control technique with narrow tracks.

In the timing control method, as discussed above, since there are large distances from a position of detecting the PG signal to positions of detecting the individual synchronizing signals, a timing error is liable to get influence of jitter and off-centered shaft of a rotary drum. It is especially difficult to obtain accurate tracking error data, as the closer the synchronizing signal is to a tail end of the track the greater the influence of jitter and off-centered shaft of the rotary drum. Furthermore, the influence of jitter and off-centered shaft of the rotary drum becomes even more significant if the rotary drum is small and light in weight.

SUMMARY OF THE INVENTION

A magnetic recording and reproducing apparatus includes a rotary drum including first and second heads having azimuth angles different from each other and arranged along a periphery of the rotary drum, for recording data in a track oblique to a longitudinal direction of a magnetic tape, and for reproducing the data on the track, a sync-signal generator for generating a recording synchronizing signal to be recorded on the magnetic tape, and for outputting the recording synchronizing signal to the first and second heads, a sync-signal time difference detector for detecting a time difference between reproduced synchronizing signals reproduced from the magnetic tape and output from the first and second heads, respectively, and a capstan-motor controller for controlling rotation of a capstan motor advancing the magnetic tape based on the time difference output from the sync-signal time difference detector. The sync-signal generator outputs the recording synchronizing signal to the first and second heads substantially simultaneously.

The magnetic recording/reproducing apparatus detects an accurate tracking error data not influenced easily by jitter and off-centered shaft of the rotary drum, and realizes highly accurate tracking by using this tracking error data.

BRIEF DESCRIPTION OF THE DRAWINGS

FIG. 9 is a pattern illustration showing a relation of phases of heads to tracks during normal reproduction in the magnetic recording/reproducing apparatus according to the third the exemplary embodiment.

FIG. 10 is a diagrammatic illustration used to explain operation of detecting a tracking position in the magnetic recording/reproducing apparatus according to the third exemplary embodiment.

FIG. 25 shows relational equations of individual parameters used to explain the magnetic recording/reproducing apparatus of the seventh exemplary embodiment.

DETAILED DESCRIPTION OF THE PREFERRED EMBODIMENTS (First Exemplary Embodiment)

Figure 1:
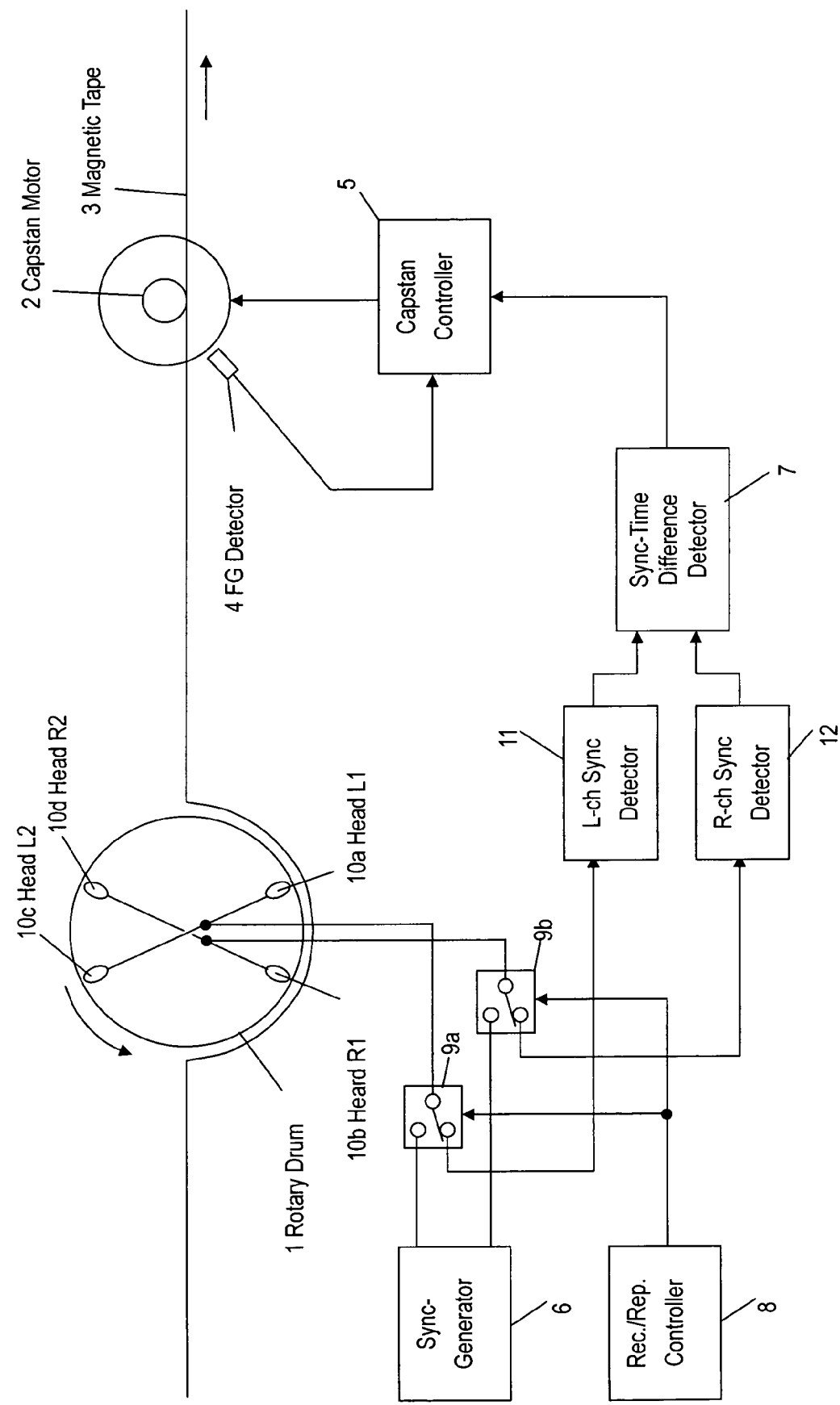
FIG. 1 is a block diagram of a magnetic recording/reproducing apparatus according to a first exemplary embodiment of the present invention.

FIG. 1 is a block diagram of a magnetic recording/reproducing apparatus according to a first exemplary embodiment. Sync-signal generator 6 outputs a recording synchronizing signal to heads 10a and 10c of L-azimuth, and heads 10b and 10d of R-azimuth, all mounted to rotary drum 1, through switches 9a and 9b, when a control signal output from recording/reproduction controller 8 is for a recording mode. The prefixed characters of L and R are used solely for the purpose of distinguishing a direction of azimuth. The azimuth angle is an angle formed by a head gap with respect to a widthwise direction of head core.

When the control signal output from recording/reproduction controller 8 is in a reproduction mode, L-ch sync-signal detector 11 detects a synchronizing signal out of reproduction signals recorded on magnetic tape 3, reproduced by L-azimuth heads 10a and 10c, and delivered through switch 9a. Likewise, R-ch sync-signal detector 12 detects a synchronizing signal out of reproduction signals recorded on magnetic tape 3, reproduced by R-azimuth heads 10b and 10d, and delivered through switch 9b. Sync-signal time difference detector 7 measures a time difference between an L-ch reproduced synchronizing signal output by L-ch sync-signal detector 11 and an R-ch reproduced synchronizing signal output by R-ch sync-signal detector 12, and detects an error from a target value. Capstan controller 5 advances magnetic tape 3 at a predetermined speed based on a frequency signal in synchronism with rotation of capstan motor 2 output by FG detector 4, and carries out tracking control by adjusting the speed on the basis of an error signal for the synchronizing signal time difference output by sync-signal time difference detector 7.

Figure 2:
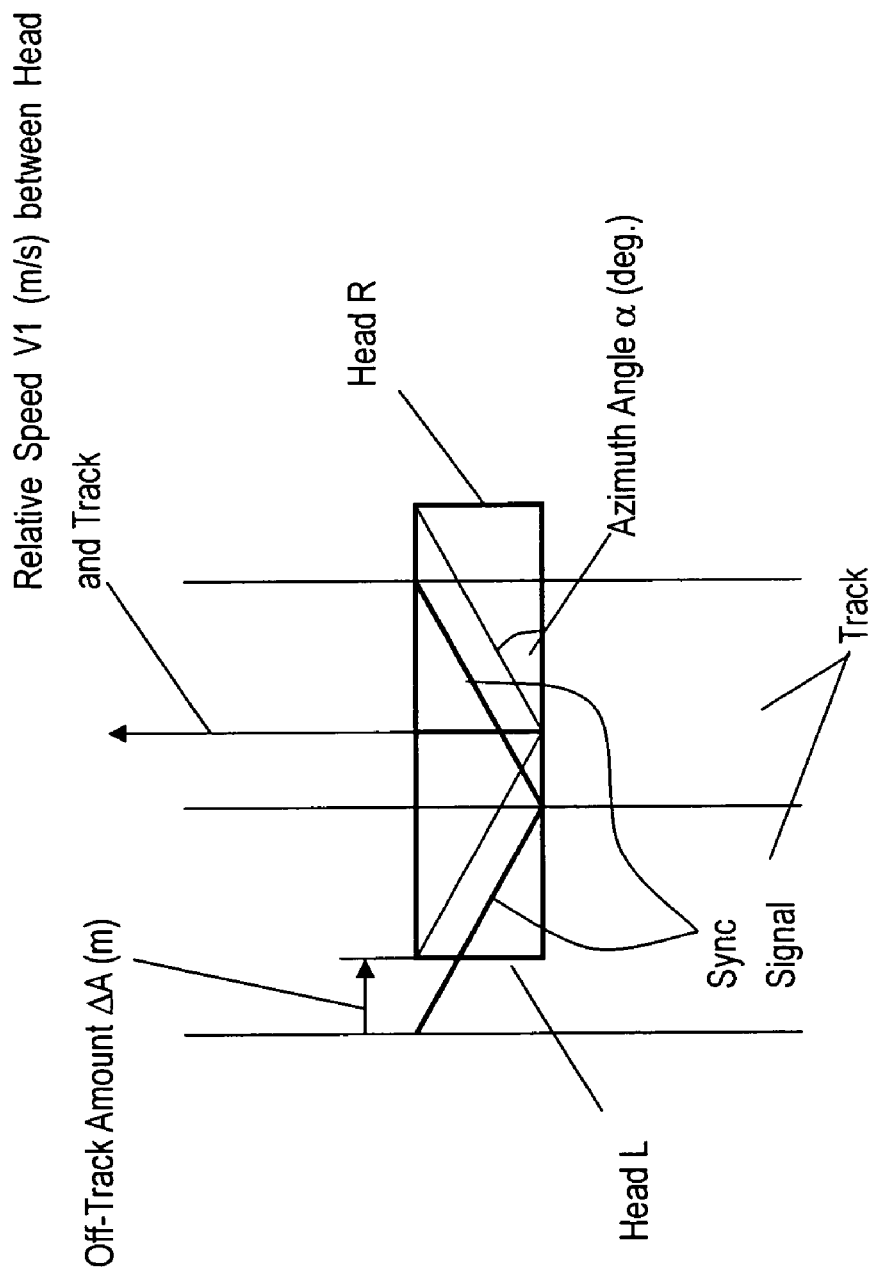
FIG. 2 is a diagrammatic illustration showing a principle of detecting a time difference of synchronizing signals in the magnetic recording/reproducing apparatus according to the first exemplary embodiment.

FIG. 2 shows an operating principle of detecting the synchronizing signal time difference. In order to make the operation simple and comprehensible, it is assumed in FIG. 2 that there are two tracks formed in a vertical direction, on which synchronizing signals of L-azimuth and R-azimuth are recorded in an equal height in the vertical direction, and head L of L-azimuth and head R of R-azimuth are mounted at an equal height in the vertical direction with respect to the tracks. It shows a case in which the head L and the head R for scanning these tracks in the vertical direction are off the tracks horizontally by a distance AA from their ideal positions in the reproducing operation. Synchronizing signal time difference Ta representing a tracking error data in this condition can be expressed by the equation $$Ta = 2 \cdot \Delta A \cdot (\tan \alpha)/V1$$

where $\alpha$ is an azimuth angle, and V1 denotes a relative speed of the heads to the tracks.

Figure 3:
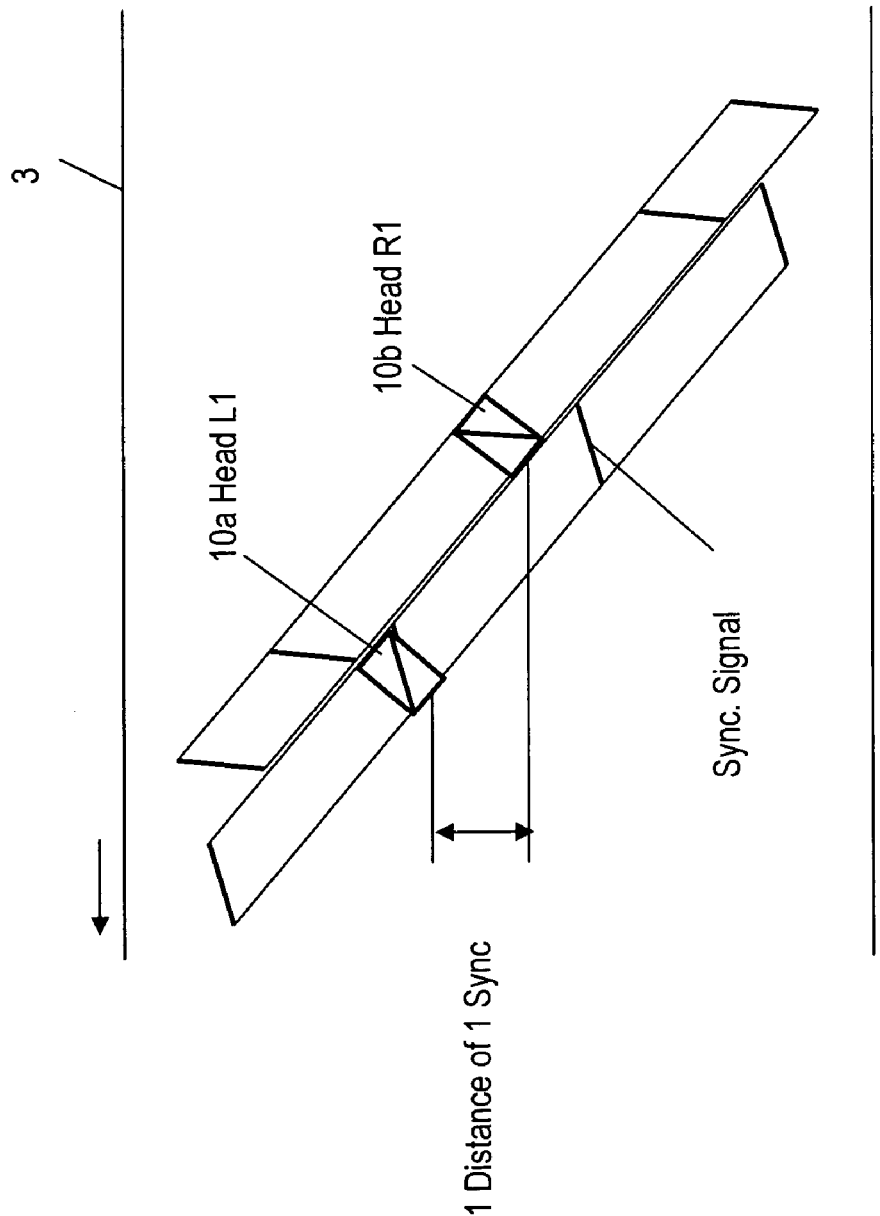
FIG. 3 is a diagrammatic illustration used to explain operation of detecting the time difference of synchronizing signals in the magnetic recording/reproducing apparatus according to the first exemplary embodiment.

FIG. 3 is a diagrammatic illustration used to explain an operation of detecting a time difference of synchronizing signals in the magnetic recording/reproducing apparatus of this exemplary embodiment. It shows an example of reproducing a synchronizing signal of L-azimuth and another synchronizing signal of R-azimuth recorded on the tracks by head L1 (10a) of L-azimuth and head R1 (10b) of R-azimuth respectively. In this figure, head L1 (10a) and head R1 (10b) are arranged with a distance equal to one synchronizing signal length in the vertical direction, and the both heads reproduce their respective synchronizing signals in the same timing. If a phase of magnetic tape 3 advances relative to the heads, a synchronizing signal time difference is detected as an error signal of positive side, as in the case of FIG. 2, and if the phase of magnetic tape 3 delays, the synchronizing signal time difference is detected as an error signal of negative side. Capstan controller 5 performs the tracking control based on these error signals of synchronizing signal time difference.

Use of the head of L-azimuth and the head of R-azimuth to record simultaneously the respective synchronizing signals can thus prevent an error in the recording positions that is liable to occur between the synchronizing signal of L-azimuth and the synchronizing signal of R-azimuth due to jitter and off-centered shaft of the rotary drum. In addition, detecting the synchronizing signals reproduced by the head of L-azimuth and the head of R-azimuth at generally the same time during the reproducing operation can also reduce substantially an adverse effect of the jitter and off-centered shaft of the rotary drum produced in detecting the individual synchronizing signals.

Further, the above sync-signal generator composes "n" number of synchronizing blocks ("n" represents an integer of 1 or larger) in each track, and outputs a recording synchronizing signal for each synchronizing block. Each pair of heads 10a and 10b, and 10c and 10d are arranged individually on the rotary drum with a mutual distance generally equal to an integral multiple of a length of the synchronizing block over the track on the magnetic tape. Using the structure discussed above, the magnetic recording/reproducing apparatus of this invention can detect reproduced synchronizing signals of the individual heads at the time. The structure can therefore ensure a sufficient space between heads 10a and 10b as well as between heads 10c and 10d, thereby making it possible to detect a tracking error data with scarcely an influence of jitter and of off-centered shaft of the rotary drum even though the heads are not mounted close to one another.

The present invention has a remarkable advantage in the practical use especially for the latest magnetic recording/reproducing apparatuses that are equipped with small rotary drums having several tens of millimeters in diameters.

(Second Exemplary Embodiment)

Figure 4:
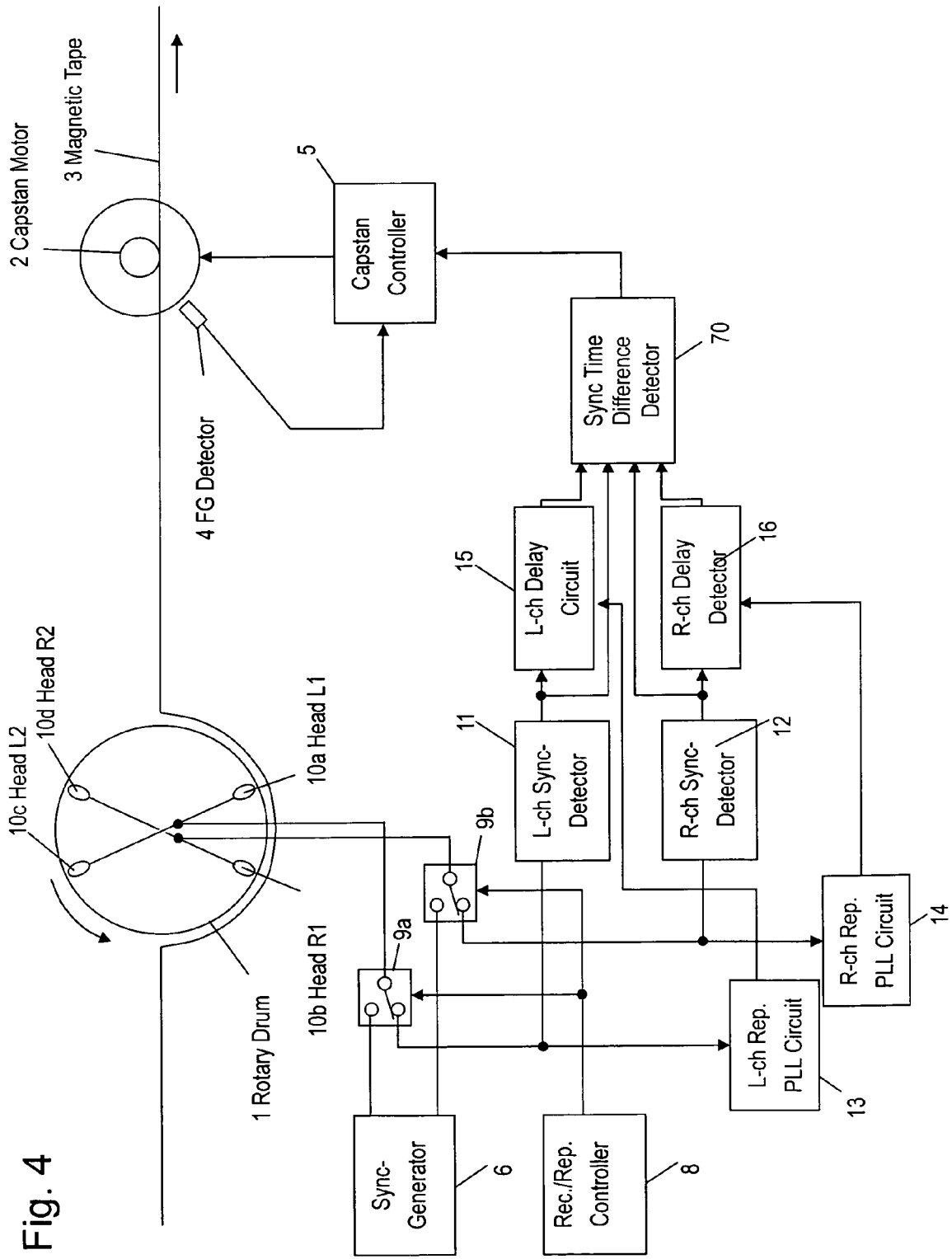
FIG. 4 is a block diagram of a magnetic recording/reproducing apparatus according to a second exemplary embodiment of the present invention.

FIG. 4 is a block diagram of a magnetic recording/reproducing apparatus of the second exemplary embodiment. Components of like functions as those of the magnetic recording/reproducing apparatus of the first exemplary embodiment are designated with like reference numerals, and their details will be skipped. L-ch reproduction PLL circuit 13 generates clocks in synchronism with reproduced signals of heads 10a and 10c output through switch 9a, when a control signal output by recording/reproduction controller 8 is in a reproduction mode. Similarly, R-ch reproduction PLL circuit 14 generates clocks in synchronism with reproduced signals of heads 10b and 10d output through switch 9b. L-ch delay circuit 15 delays an L-ch reproduced synchronizing signal output by L-ch sync-signal detector 11 for a predetermined time using L-ch reproduction clocks output by L-ch reproduction PLL circuit 13. Likewise, R-ch delay circuit 16 delays an R-ch reproduced synchronizing signal output by R-ch sync-signal detector 12 for a predetermined time using R-ch reproduction clocks output by R-ch reproduction PLL circuit 14. Sync-signal time difference detector 70 receives inputs of the L-ch reproduced synchronizing signal output by L-ch sync-signal detector 11, an L-ch reproduced pseudo-synchronizing signal output by delay circuit 15, the R-ch reproduced synchronizing signal output by R-ch sync-signal detector 12, and an R-ch reproduced pseudo-synchronizing signal output by R-ch delay circuit 16. It then measures a time difference between any of the L-ch reproduced synchronizing signal and the L-ch reproduced pseudo-synchronizing signal and any of the R-ch reproduced synchronizing signal and the R-ch reproduced pseudo-synchronizing signal, and detects an error from a target value.

Figure 5B:
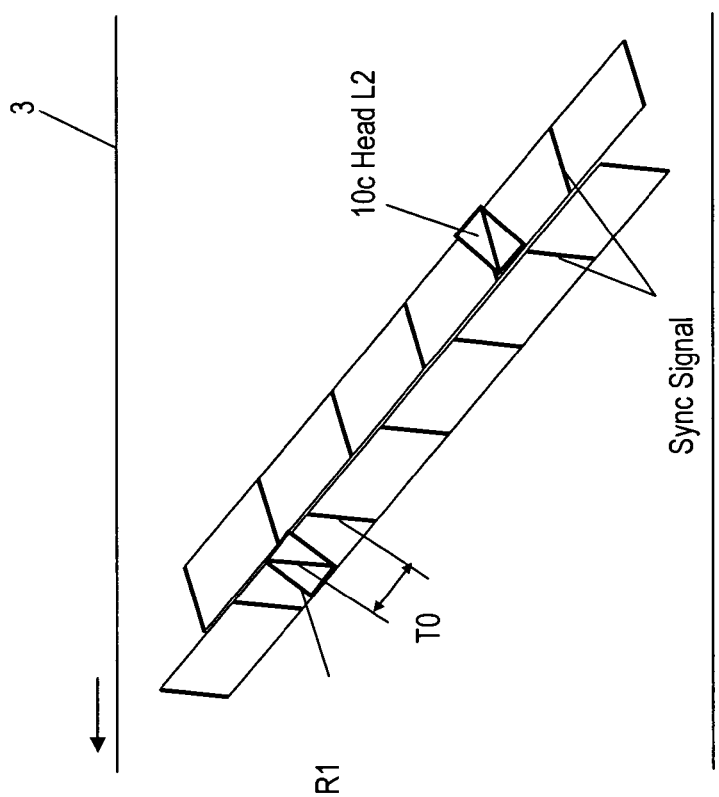
FIG. 5A and FIG. 5B are diagrammatic illustrations used to explain operation of detecting a time difference of synchronizing signals in the magnetic recording/reproducing apparatus according to the second exemplary embodiment.
Figure 5A:
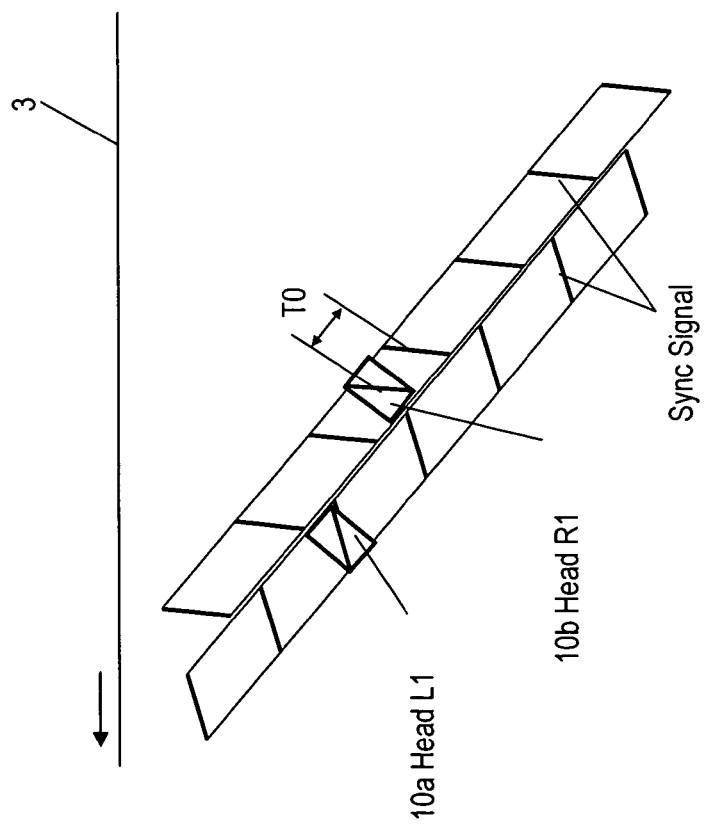

The magnetic recording/reproducing apparatus constructed as above operates in a manner, which will be described hereinafter with reference to FIG. 5A and FIG. 5B. FIG. 5A and FIG. 5B are diagrammatic illustrations showing an operation of detecting a time difference of synchronizing signals in the case head L1 (10a) and head R1 (10b) are arranged in positions where a distance between them is not equal to an integral multiple of a length of synchronizing block in a widthwise direction of the tape. Here, description is provided of an example wherein sync-signal time difference detector 70 uses the L-ch reproduced synchronizing signal output by L-ch sync-signal detector 11 and the R-ch reproduced pseudo-synchronizing signal output by R-ch delay circuit 16. The R-ch reproduced pseudo-synchronizing signal is delayed from the R-ch reproduced synchronizing signal output by the R-ch sync-signal detector by a period of time T0 using R-ch reproduction clocks output by R-ch reproduction PLL circuit 14. FIG. 5A shows that head R1 (10b) is located in a position behind the preceding synchronizing signal by just a period of time T0 when head L1 (10a) reproduces a synchronizing signal. On the other hand, FIG. 5B shows that head R1 (10b) is in a position behind the preceding synchronizing signal by just a period of time T0 when head L2 (10c) reproduces another synchronizing signal.

In the state of FIG. 5A, sync-signal time difference detector 70 measures a time difference between a reproduced synchronizing signal of head L1 output by L-ch sync-signal detector 11 and a reproduced pseudo-synchronizing signal of head R1 output by R-ch delay circuit 16, and outputs a deviation from the target value as a tracking error data to capstan controller 5. Also, in the state of FIG. 5B, sync-signal time difference detector 70 measures a time difference between a reproduced synchronizing signal of head L2 (10c) output by L-ch sync-signal detector 11 and a reproduced pseudo-synchronizing signal of head R1 output by R-ch delay circuit 16, and outputs a deviation from the target value as another tracking error data to capstan controller 5. Capstan controller 5 thus carries out tracking control in the same manner as described in the first exemplary embodiment.

With the structure as described, the apparatus is able to detect a time difference by the first head and the second head disposed with their distance generally not equal to an interval of the recorded positions of the synchronizing signals, with the aid of reproduced pseudo-synchronizing signals, even at different positions from the synchronizing signals recorded at the same time. As a result, this structure can further alleviate limitation on the mounting positions of the first head and the second head as compared to the first exemplary embodiment, thereby allowing arrangement of the first head and the second head freely without regard to the integral multiple of the length of the synchronizing blocks. Accordingly, this further increases flexibility of arranging the individual heads to the rotary drum in making the magnetic recording/reproducing apparatus of this invention into practical use.

Furthermore, in the case where the first head and the second head are separated in distance, this embodiment uses a time difference of the reproduced synchronizing signals output by the second head and the third head to avoid a problem in which the tracking error data produced from the time difference of the reproduced synchronizing signals output by the first and the second heads may be disrupted in the longitudinal direction of the tracks. In addition, an influence of jitter of the rotary drum can be reduced by recording the recording synchronizing signals at the same timing with the first, the second, and the third heads, thereby expanding a detectable range of the tracking error data in the longitudinal direction of the tracks.

Although drawing is not provided to show details, a structure may be composed in the following manner in the above case to alleviate limitation on the mounting positions of the first head, the second head and the third head.

The sync-signal generator composes each track with "n" number of synchronizing blocks ("n" represents an integer of 1 or larger), and outputs a recording synchronizing signal for each synchronizing block. The first head and the second head are arranged on the rotary drum with a mutual distance generally equal to an integral multiple of a length of the synchronizing block over the track on the magnetic tape, and the second head and the third head are also arranged on the same rotary drum with a mutual distance generally equal to an integral multiple of the length of the synchronizing block over the track on the magnetic tape.

The sync-signal generator outputs a first recording synchronizing signal to the first head, a second recording synchronizing signal to the second head, and a third recording synchronizing signal to the third head, in a manner that the first recording synchronizing signal is output with a lag of a predetermined time T2 after the second recording synchronizing signal, and the third recording synchronizing signal is output with another lag of a predetermined time T3 after the second recording synchronizing signal. The sync-signal time difference detector detects a time difference between a first reproduced pseudo-synchronizing signal, which is produced by delaying a second reproduced synchronizing signal reproduced by the second head by a number of reproduction clocks equivalent to the predetermined time T2, and a first reproduced synchronizing signal reproduced by the first head, when the first head is in the reproducing operation. The sync-signal time difference detector also detects another time difference between a second reproduced pseudo-synchronizing signal, which is produced by delaying the second reproduced synchronizing signal reproduced by the second head by a number of reproduction clocks equivalent to the predetermined time T3, and a third reproduced synchronizing signal detected by the third head, when the third head is in the reproducing operation. The above operation can record and reproduce the synchronizing signals by correcting variations in the mounting position among the three heads.

Figure 6:
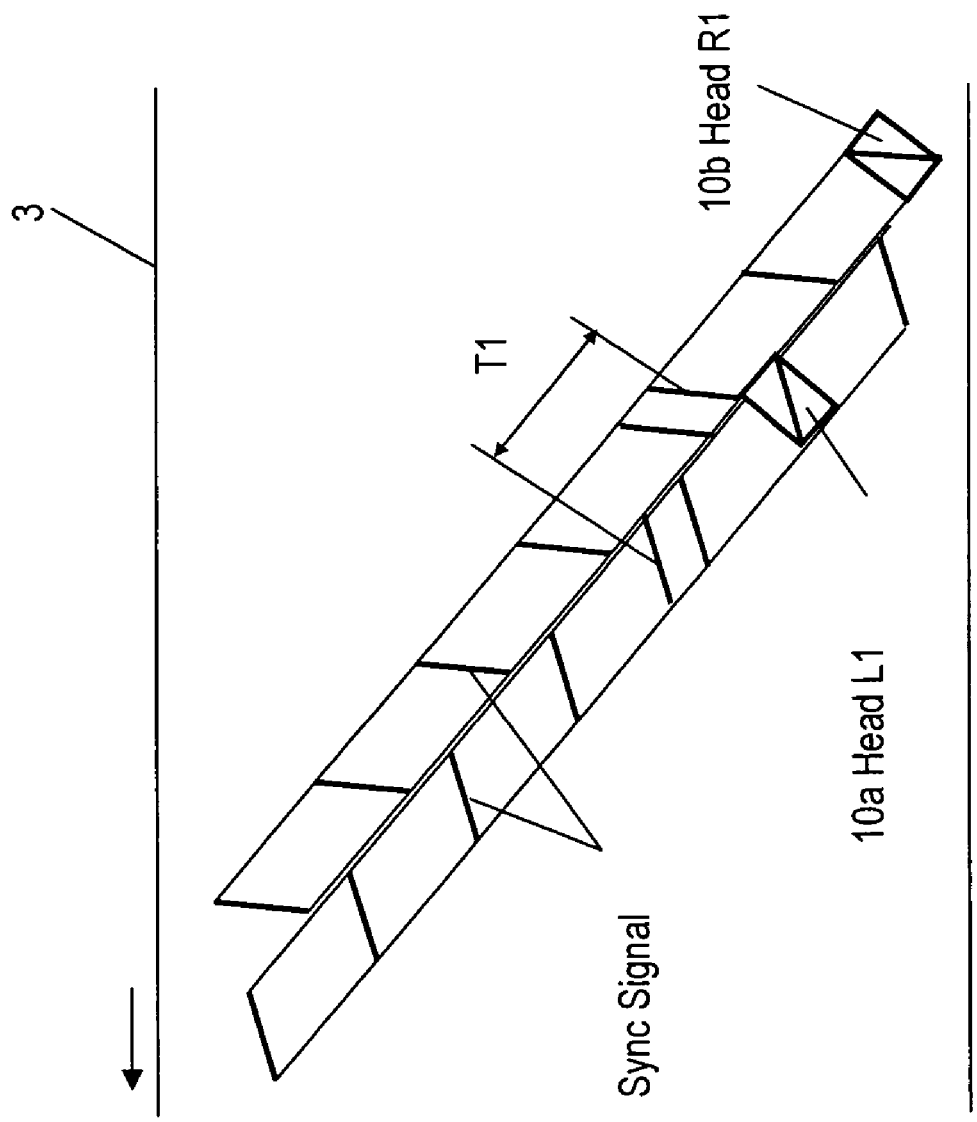
FIG. 6 is a diagrammatic illustration used to explain operation of detecting a time difference of synchronizing signals in a disrupted synchronizing pattern in the magnetic recording/reproducing apparatus according to the second exemplary embodiment.
Figure 7:
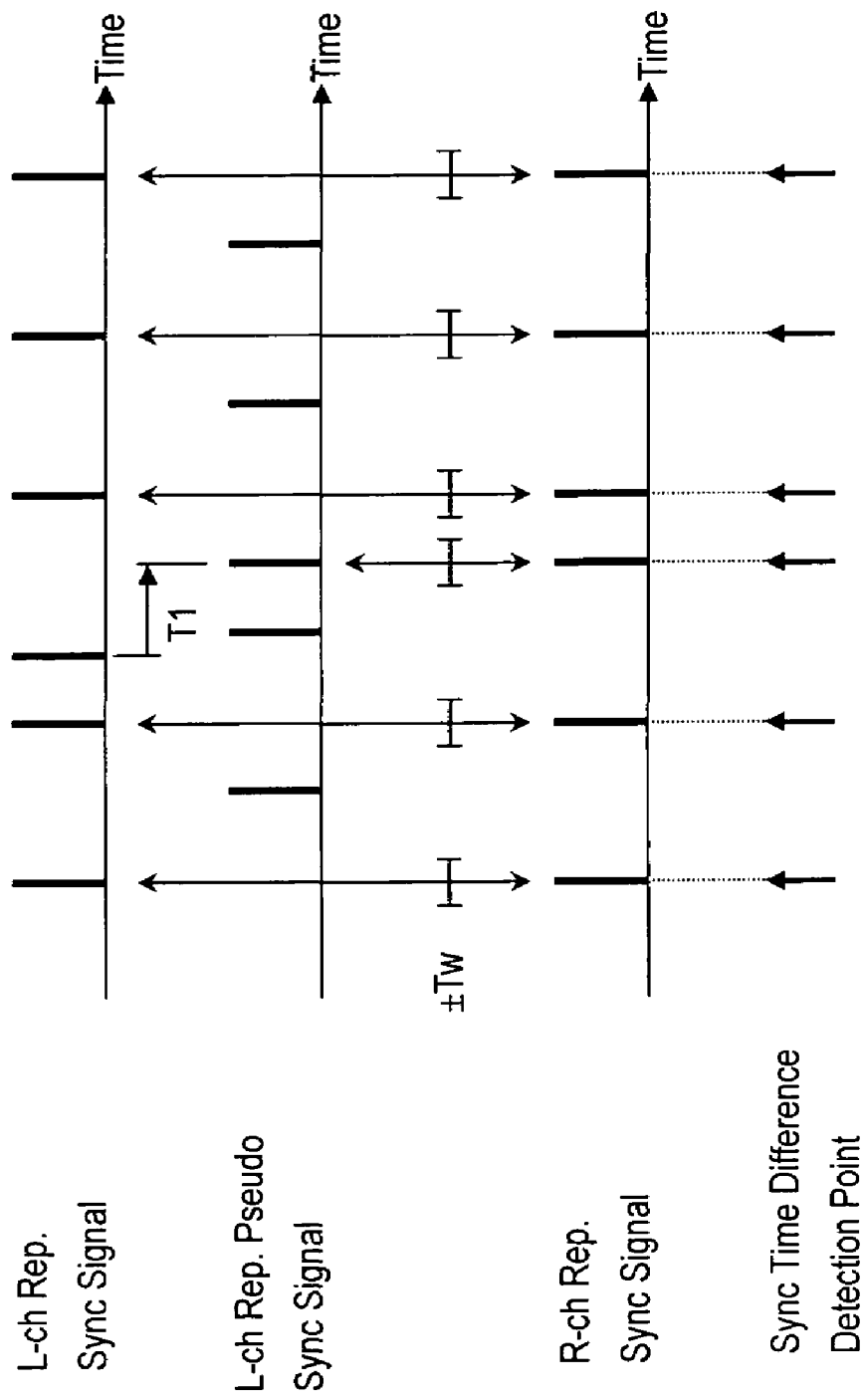
FIG. 7 is a diagrammatic illustration used to explain operation of detecting a reproduced synchronizing signal in the magnetic recording/reproducing apparatus according to the second exemplary embodiment.

Description is provided next pertaining to a case of recording and reproducing such data as video and audio data, in which an editing gap exists between an image data area and an audio data area. In this case, there exists an area where intervals of synchronizing signals are not constant on a track. FIG. 6 is a diagrammatic drawing illustrating an operation, which realizes detection of a time difference of synchronizing signals even when such tracks are reproduced. FIG. 7 is a diagrammatic illustration showing L-ch reproduced synchronizing signals detected when the tracks shown in FIG. 6 are reproduced by head L1 (10a), L-ch reproduced pseudo-synchronizing signals produced in L-ch delay circuit 15 by delaying the L-ch reproduced synchronizing signals by a period of time T1 with L-ch reproduction clocks output by L-ch reproduction PLL circuit 13, and R-ch reproduced synchronizing signals detected when reproducing by head R1 (10b), with the abscissa designating a time sequence.

When sync-signal time difference detector 70 compares any of the reproduced synchronizing signals from head L1 (10a) and the reproduced pseudo-synchronizing signals from head L1 with the reproduced synchronizing signals from head R1 (10b), it compares only those synchronizing signals that lie within a range of ±Tw as marked by arrows shown in FIG. 7 as synchronizing signal time difference detecting points.

With the structure composed as described, the apparatus is able to detect a tracking error data by detecting the time differences of any of the reproduced synchronizing signals and the reproduced pseudo-synchronizing signals output by the second head with the reproduced synchronizing signals output by the first head, even in the tracks where the synchronizing signals are not recorded at regular intervals.

(Third Exemplary Embodiment)

Figure 8:
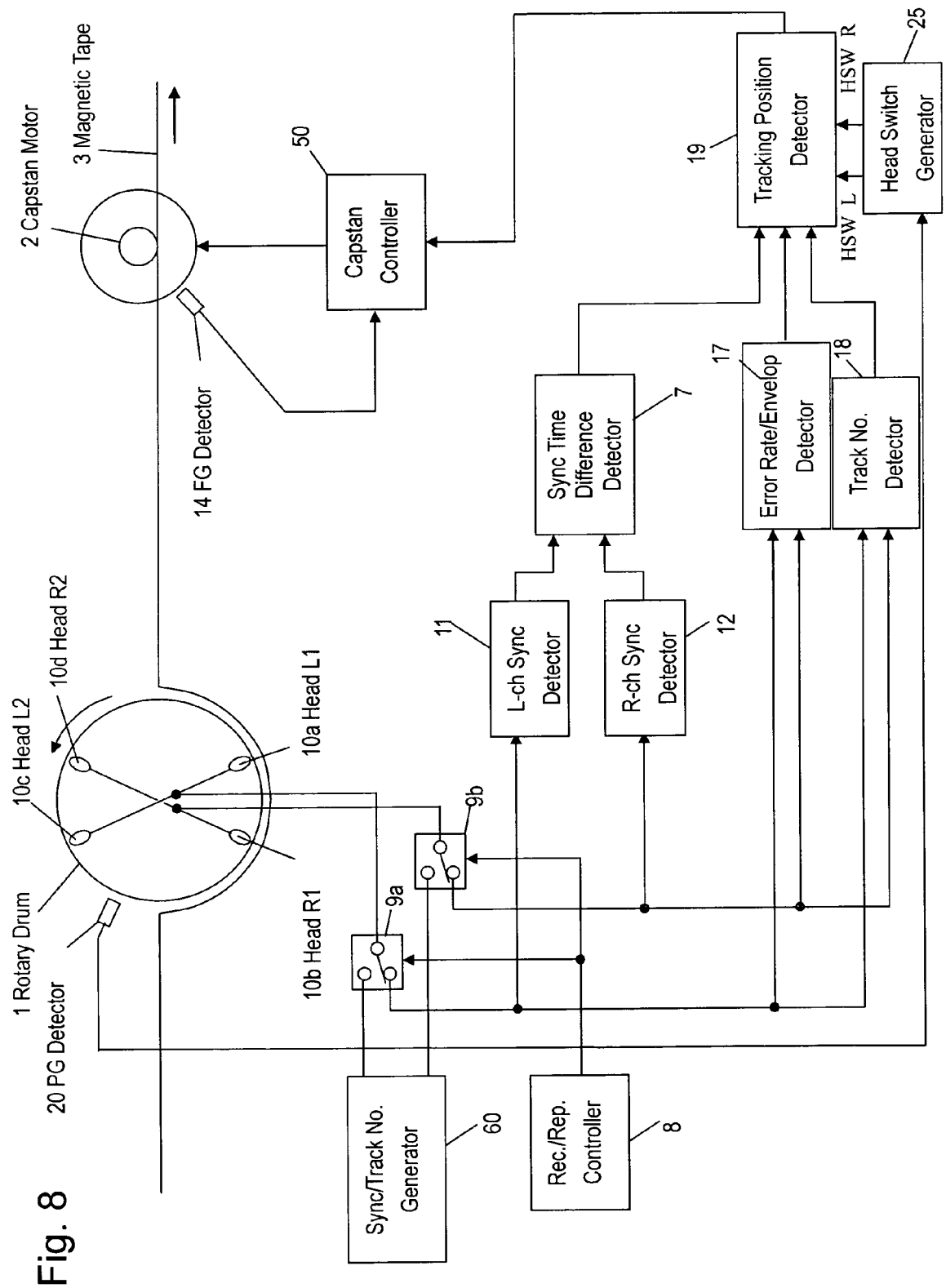
FIG. 8 is a block diagram of a magnetic recording/reproducing apparatus according to a third exemplary embodiment of the present invention.

FIG. 8 is a block diagram showing a structure of a magnetic recording/reproducing apparatus of the third exemplary embodiment. Components of like functions as those of the magnetic recording/reproducing apparatus of the first exemplary embodiment are designated with like reference numerals, and their details will therefore be skipped.

In this exemplary embodiment, a track number data is recorded on each of tracks as a position data for the track, as a single unit, on which each head scans, as will be described later. In addition, description is provided hereinafter of a method of detecting a tracking position in order for each head to reproduce data it recorded in the same track by providing another reproduction mode, which transfers a magnetic tape at a different speed than the normal speed.

Sync/track number generator 60 outputs a synchronizing signal and a track number data to be recorded to heads 10a and 10c through switch 9a, and also to heads 10b and 10d through switch 9b, when a control signal output by recording/reproduction controller 8 is in a recording mode. Error rate/envelope detector 17 detects any of error rates and envelope levels of signals reproduced by heads 10a and 10c through switch 9a, as well as those of signals reproduced by heads 10b and 10d through switch 9b, when the control signal is for a reproduction mode. Track number detector 18 detects an L-ch reproduced track number reproduced by heads 10a and 10c through switch 9a and an R-ch reproduced track number output by heads 10b and 10d through switch 9b, when the control signal output by record signal controller 8 is in a reproduction mode. Head switching generator 25 generates a head switching signal (HSW_L) for heads 10a and 10c and another head switching signal (HSW_R) for heads 10b and 10d from a PG signal in synchronism with rotation of rotary drum 1 which is output by PG detector 20.

When there is another mode provided in this embodiment enabling capstan controller 50 to set a different advancing speed for magnetic tape 3 than the normal speed, tracking position detector 19 can detect a position to be tracked based on a synchronizing signal time difference error data output by sync-signal time difference detector 7, an error rate data or an envelope level data output by error rate/envelope detector 17, a reproduction track number data output by track number detector 18, and head switching signals HSW_L and HSW_R output by head switching generator 25.

When advancing speed of magnetic tape 3 is set to the normal speed, capstan controller 50 can perform tracking control based on the tracking error data output by tracking position detector 19.

FIG. 9 is a pattern illustration showing a relation of phases of heads to tracks during a reproducing operation at the normal speed. During a recording mode, head L1 and head R1 record on tracks of even numbers, and head L2 and head R2 record on tracks of odd numbers respectively, assuming that the recording is made consecutively on pairs of tracks beginning with number 0 to number 5, as these pairs are numbered serially from 0, 1, 2, 3, 4, 5, 0 and so on, as depicted in the figure.

Referring now to FIG. 10, description is provided hereinafter of an operation for detecting tracking positions during reproduction of magnetic tape shown in FIG. 9.

FIG. 10 represents a case in which advancing speed of magnetic tape 3 is set with capstan controller 50 to 10/9 (ten-ninth) of the normal speed in the reproducing operation, wherein it shows head switching waveforms (HSW_L and HSW_R) for scanning the individual tracks, track numbers to be reproduced by the individual heads, time difference of reproduced synchronizing signals between head L1 and head R1 or between head L2 and head R2, an error rate of a reproduced signal from any of the heads or a mean error rate of reproduced signals from a plurality of the heads, and an envelope detection level of the reproduced signal from any of the heads or a mean envelope detection level of the reproduced signals from the plurality of heads.

Description is provided next of a method of distinguishing the tracks recorded by head L1 and head R1 from the tracks recorded by head L2, and head R2, using a combination of the heads scanning the tracks and track numbers of the tracks being reproduced, with the tape being transferred in the above manner at a different speed than the normal speed.

If there is a variation in the mounting height of the heads disposed on the rotary drum, the following may be cases in the time difference of the reproduced synchronizing signals. When head L1 and head R1 reproduce data on same tracks they recorded, for example, the reproduced synchronizing signals have no time difference between them in the on-track condition. However, when head L1 and head R1 reproduce data recorded by head L2 and head R2 on different tracks, the reproduced synchronizing signals have a time difference therebetween in the on-track condition.

For this reason, a tracking control is so made in a reproduction mode of the normal speed that head L1 and head R1 reproduce data on the tracks of even number, and head L2 and head R2 reproduce data on the tracks of odd number. Therefore, tracking position detector 19 outputs a time difference of synchronizing signals as a tracking error data shown in FIG. 10, which will be described in detail later.

When head L1 and head R1 are in reproduction of data on the tracks of track number 0 (tracks of even number), the tracking position is plotted as point (1) in time difference of the synchronizing signals in FIG. 10. This tracking position can be taken in two ways, i.e. to establish either a midpoint between the maximum value and the minimum value of the time difference of synchronizing signals within a range (8) shown in FIG. 10, as one method, or a mean value of the time difference of synchronizing signals within the same range, as another method.

Both of these methods are useful for detecting a center position from a point where the synchronizing signal begins being reproduced to another point where the synchronizing signal becomes not reproducible. Accordingly, it makes possible to detect a tracking position, which yields a maximum margin from one track to be scanned by a given head to another track of the same azimuth located next to the adjacent track.

In addition, this tracking position can be given as a point of the lowest error rate output by error rate/envelope detector 17. Therefore, detection of the error rate may be used together to make correction of errors that results in the time difference of synchronizing signals due to changes in temperature and humidity during recording and reproducing operations.

Figure 11B:
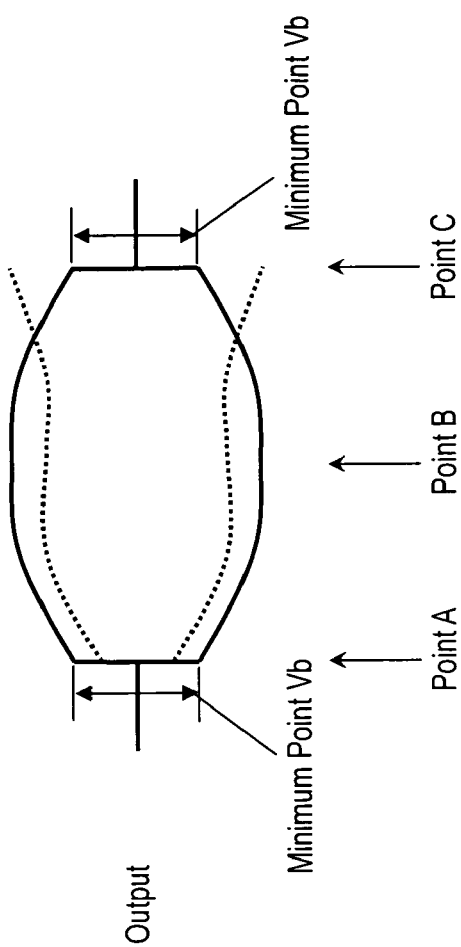
FIG. 11 is a diagrammatic drawing for explaining operation of detecting a tracking position based on an enveloped level in the magnetic recording/reproducing apparatus according to the third exemplary embodiment.
Figure 11A:
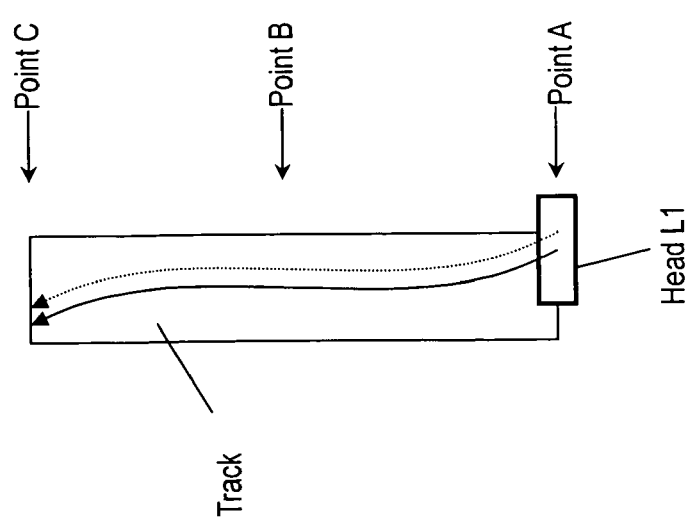

Description is given next of a method of obtaining the best tracking position from a detected level of envelope. FIG. 11 is a diagrammatic drawing illustrating an operation of detecting the tracking position using a detected level of envelope. FIG. 11A shows an example of detecting output levels reproduced by head L1 at point A, point B and point C, on an assumption that a scanning locus of the head is curved with respect to the track as shown. An actual waveform of the reproduced output by the head is shown in FIG. 11B. In FIG. 11A, one of the curves in a dotted line indicates a center of the locus where head L1 scans when a phase of magnetic tape 3 is slightly advanced. A dotted line in FIG. 11B shows an actual waveform of the reproduced envelope when the phase is slightly advanced in the same degree. In observing FIG. 10 for changes of detected levels of the envelopes with respect to time at the point A, point B and point C, it is found that the tracking positions are deviated from points of maximum value in the envelope level at both the point A and the point C, although the tracking position at point B is in line with the point of maximum value in the envelope level. Since the track is deviated in the opposite directions at the point A and the point C, as shown in FIG. 11A, it is known that a point where the envelope levels detected at the point A and the point C balance with each other, that is, the point at which the lowest points (the minimum values) Vb of these envelope levels become equal, as shown in FIG. 11B, is regarded as the tracking position. When using a detected level of the envelope to obtain a tracking position, detection is made for envelope levels at a plurality of points within a scanning duration of the heads. The tracking position is then determined as a position where the lowest point of the envelope level becomes the largest.

Using FIG. 10, description is now provided of an actual method of controlling the head to track the tracking position. Described first pertains to changes in output of a synchronizing signal time difference when capstan controller 50 sets an advancing speed of magnetic tape 3 to 10/9 (ten-ninth) of the normal speed. In the range (8) of the figure, head L1 and head R1 or head L2 and head R2 can reproduce synchronizing signals. When the time goes by to exceed this range and the synchronizing signals are not reproducible in a range (3), the last synchronizing signal time difference is held. As the synchronizing signal begins being reproduced again, a synchronizing signal time difference in value equivalent to a phase of two tracks is added to the actual synchronizing signal time difference, as shown by line (4). Following a point when the phase is deviated by two tracks from the original tracking position (1), a synchronizing signal time difference in value equivalent to a phase of two tracks is subtracted from the actual synchronizing signal time difference as shown by line (5). When the time goes by and the synchronizing signals again become not reproducible as shows by line (6), the last synchronizing signal time difference is held.

Broken line (2) indicates the last synchronizing signal time difference, which is held immediately prior to line (4) where the synchronizing signal time difference became not reproducible when the tracking position is shifted from line (4) to line (1) in the case tracking control is carried out with the normal speed.

Broken line (7) indicates a tracking position when a reproducing operation is carried out with unmatched track number.

As described above, tracking position detector 29 detects positions of the heads as to which tracks they are scanning, by replaying a tape with its advancing speed faster than the normal speed, and outputs corrected synchronizing signal time difference to capstan controller 50. As a result, tracking control can be carried out in a manner that head L1 and head R1 reproduce data they recorded on the same tracks of even number, and head L2 and head R2 reproduce data they recorded on the same tracks of odd number, by switching back to the normal speed in the subsequent reproducing operation. By carried out the tracking control in this manner in a periodicity of four tracks, individual heads can reproduce the data they recorded on the same tracks. The apparatus can therefore reduce substantially a deviation of time difference of the reproduced synchronizing signals under the on-track condition caused by variations in mounting heights of the individual heads disposed on rotary drum 1. In addition, a process of the tracking control can be simplified when the magnetic tape is started from the standing state and reproduced again at the normal speed, because the tracking positions need not be detected for the second time.

Furthermore, this magnetic recording/reproducing apparatus can also detect an accurate tracking error data not liable to the influence of jitter and off-centered shaft of a rotary drum even when the apparatus is provided with reproduction-only heads separate from the recording heads, by arranging a distance between the two reproduction heads for detecting a time difference of the reproduced synchronizing signals into the same distance with the two recording heads for recording the synchronizing signals.

(Fourth Exemplary Embodiment)

Figure 12:
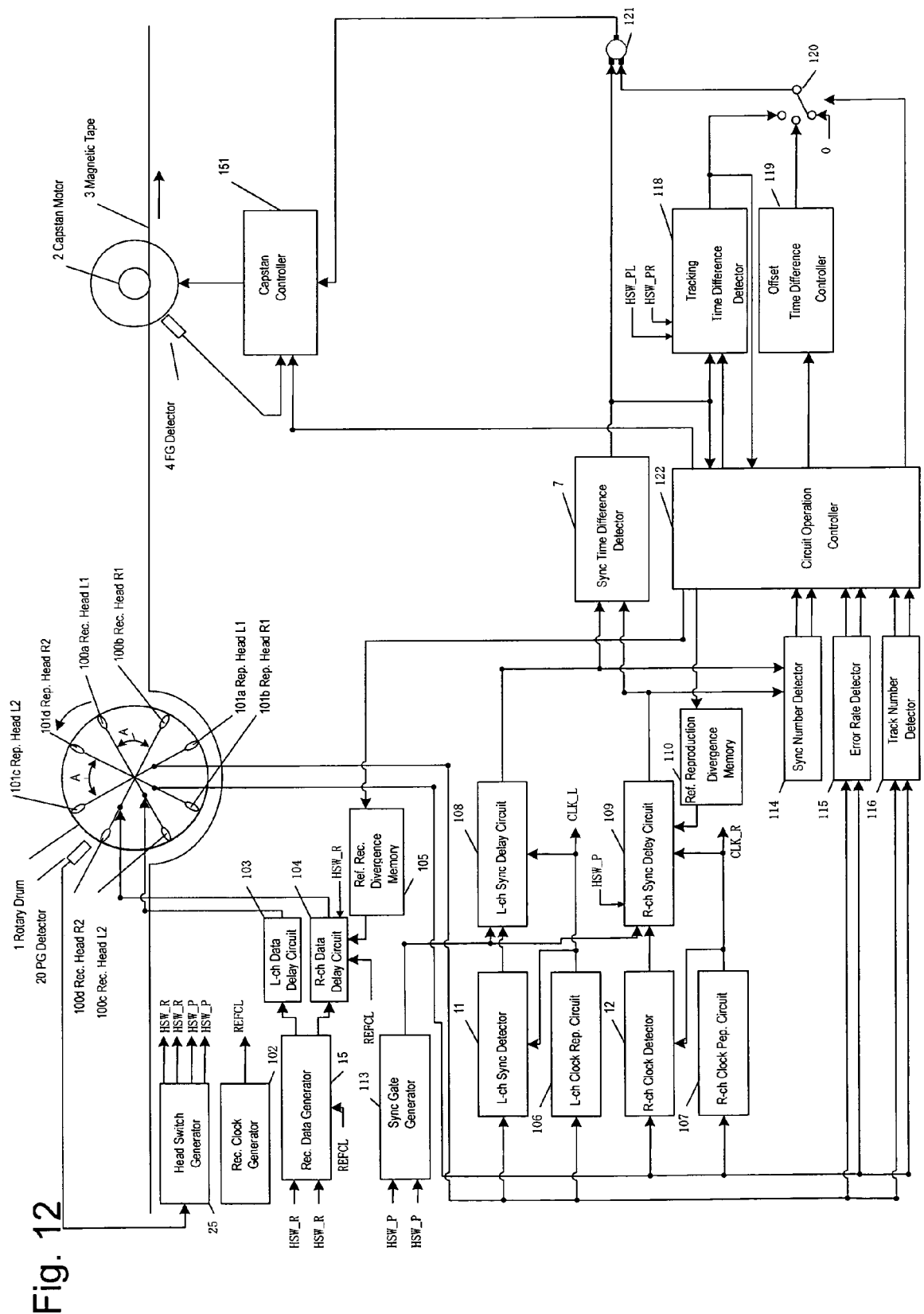
FIG. 12 is a block diagram of a magnetic recording/reproducing apparatus according to a fourth exemplary embodiment.

FIG. 12 is a block diagram of a magnetic recording/reproducing apparatus according to the fourth exemplary embodiment.

In this exemplary embodiment, a track number data is recorded on each of tracks as a position data for the track, as a single unit, on which each head scans, as will be described later. In addition, this exemplary embodiment will disclose a method of detecting a tracking position for use by a head to reproduce data from a track recorded by the head itself, and a time difference of synchronizing signals (hereinafter referred to as "target tracking time difference") corresponding to an optimum tracking position with high accuracy and in a short time while detecting a condition of reproducing operation, by way of reproducing a magnetic tape at the normal speed, and gradually adding or subtracting an offset value to the time difference of the synchronizing signals being detected. Since this allows detection of an error data on deviation of the time difference of the reproduced synchronizing signals under the on-track condition, caused by variation of mounting height and the like of the individual heads disposed on the rotary drum, the apparatus can detect an optimum tracking position for each track.

Recording heads 100*a* and 100*c* of L-azimuth and recording heads 100*b* and 100*d* of R-azimuth are mounted on rotary drum 1, and a mounting angle of head 100*b* is A degree (hereinafter referred to as "head-stagger angle A") with respect to head 100*a*. Likewise, head 100*d* is also mounted at head-stagger angle A with respect to head 100*c*.

Besides, reproducing heads 101*a* and 101*c* of L-azimuth and reproducing heads 101*b* and 101*d* of R-azimuth are also mounted on rotary drum 1. All the heads are mounted at the same head-stagger angle A. Reproducing head 101*a* is arranged to such a head height that it can reproduce data on a track recorded by recording head 100*a* at almost the same time, and reproducing heads 101*b*, 101*c* and 101*d* are also arranged in the like manner to such head heights that they can reproduce data on tracks recorded by recording heads 100*b*, 100*c* and 100*d* respectively at almost the same time. Head switching generator 25 generates a head switching signal (HSW_RL) for recording heads 100*a* and 100*c*, a head switching signal (HSW_RR) for recording heads 100*b* and 100*d*, a head switching signal (HSW_PL) for reproducing heads 101*a* and 101*c*, a head switching signal (HSW_PR) for reproducing heads 101*b* and 101*d*, by taking a PG signal in synchronism with rotation of rotary drum 1, output by PG detector 20.

Recording clock generator 102 defining a reference clock (hereinafter referred to as "REFCLK") is used for generating a recording synchronizing signal, and it includes a quartz oscillator or the like.

Recording data generator 150 generates an L-channel recording data in synchronism with the head switching signal HSW_RL, the L-channel recording data including a recording data containing a recording synchronizing signal for heads 100*a* and 100*c* and track number, and a parity data for detecting an error of the data. Recording clock generator 102 generates R-channel recording data in synchronism with the head switching signal HSW_RR, the R-channel recording data including recording data containing a recording synchronizing signal for heads 100*b* and 100*d*, and a parity data for detecting an error of the data. L-ch data delay circuit 103 delays the L-channel recording data by a predetermined number of clocks B with a periodicity of REFCLK. R-ch data delay circuit 104 delays the R-channel recording data for a variable period from 0 to (B×2) number of clocks with the periodicity of REFCLK. Recording synchronizing signal time differences among individual recording synchronizing signals can be adjusted within a range of −B to +B by adjusting a delay time of R-ch data delay circuit 103.

Reference recording divergence memory 105 stores the delay time of the R-ch data delay circuit (the delay time for use to record on a tape with a recording synchronizing signal time difference equal to that of the reference tape) individually at both high side and low side of the head switching signal HSW_RR, as a reference recording divergence time, which will be described later (P27, line 13 et seq.). A delayed L-channel recording data output by L-ch data delay circuit 103 is recorded on magnetic tape 3 by recording heads 100*a* and 100*c* after passed through a recording amplifier (not shown in the figure). Similarly, a delayed R-channel recording data output by R-ch data delay circuit 104 is recorded on magnetic tape 3 by recording heads 100*b* and 100*d* after passed through another recording amplifier (not shown in the figure). It is assumed at this time that both heads 100*a* and 100*b* form tracks of track number 0, and both heads 100*c* and 100*d* form tracks of track number 1 for recording the data respectively.

In a reproducing operation, head 101*a*, head 101*c*, head 101*b* and head 101*d* detect an L-azimuth track of track number 0, an L-azimuth track of track number 1, an R-azimuth track of track number 0 and an R-azimuth track of track number 1 respectively among the recording tracks formed on magnetic tape 3. The detected signals are decoded while being passed through reproduction amplifiers and reproduction equalization circuits (not shown in the figure), and input to L-ch sync-signal detector 11 and R-ch sync-signal detector 12. L-ch sync-signal detector 11 executes a pattern matching of a synchronizing signal from the L-ch reproduced data obtained from reproducing heads 101*a* and 101*c*, and outputs an L-ch synchronizing signal pulse which is brought to high-level only by one period of a clock wherefrom the synchronizing signal is detected. R-ch sync-signal detector 12 also executes a pattern matching of a synchronizing signal from the R-ch reproduced data obtained from reproducing heads 101*b* and 101*d*, and outputs an R-ch synchronizing signal pulse, which is brought to high-level only by one period of a clock wherefrom the synchronizing signal is detected, in the like manner. L-ch clock reproduction circuit 106 reproduces a clock (hereinafter referred to as "CLK_L") synchronized with the L-ch reproduced data. R-ch clock reproduction circuit 107 reproduces another clock (hereinafter referred to as "CLK_R") synchronized with the R-ch reproduced data. Both of clock reproduction circuits 106 and 107 are constructed of PLL circuits based on the widely known techniques.

Sync-gate generator 113 outputs an exclusive OR of the head switching signals HSW_PL and HSW_PR, in principle, as a synchronizing gate pulse. A synchronizing signal in a high-level area of this pulse is of a combination of reproducing head 101a and 101d, or a combination of reproducing head 101b and 101c. A time difference obtained in any of these combinations may occasionally diverge significantly from a synchronizing signal time difference obtained from an original combination (a combination of heads 101a and 101b, or heads 101c and 101d, which are on tracks of the same track number). Any synchronizing signal time difference of significant divergence is removed by any of L-ch sync-signal delay circuits 103 and R-ch sync-signal delay circuits 104, in order to avoid an erroneous detection.

L-ch sync-signal delay circuit 108 delays the L-ch synchronizing signal in a low-level section of the synchronizing gate pulse by a predetermined number of clocks B of a periodicity of CLK_L. R-ch sync-signal delay circuit 109 delays the R-ch synchronizing signal for a variable period from 0 to (B×2) number of clocks of a periodicity of CLK_R. Time differences among the individual reproduced synchronizing signals can thus be adjusted within a range of −B to +B.

Reference reproduction divergence memory 110 stores a delay time of the synchronizing signals (i.e. a delay time of reference reproduction divergence, as is discussed later) obtained when a reference tape prepared by another reference apparatus is replayed with the delay time of the R-ch sync-signal delay circuit, in a low-level section of the synchronizing gate pulse. Both of a delayed L-ch synchronizing signal pulse output by L-ch sync-signal delay circuit 108 and a delayed R-ch synchronizing signal pulse output by R-ch sync-signal delay circuit 109 are input to sync-signal time difference detector 7 and sync-signal counter 114. Sync-signal time difference detector 7 counts a time difference between the delayed L-ch synchronizing signal pulse and the delayed R-ch synchronizing signal pulse on the basis of REFCLK, and outputs a reproduced synchronizing signal time difference as a negative time difference when the delayed R-ch synchronizing signal pulse is in the foreside with respect to the delayed L-ch synchronizing signal pulse, or as a positive time difference when it is in the backside. Sync-signal counter 114 counts a number of the delayed L-ch synchronizing signal pulses within one period of the head switching signal HSW_PL, and outputs it as a number of synchronizing signals in the L-ch head switching period, to circuit operation controller 122. At the same time, sync-signal counter 114 counts a number of the delayed R-ch synchronizing signal pulses within one period of the head switching signal HSW_PR, and outputs it to circuit operation controller 122, as a number of synchronizing signals in the R-ch head switching period. Error rate detector 115 takes the L-ch and R-ch reproduced data as its input, detects an amount of errors in one period of the head switching signal of the recorded data from each of parity data, and outputs to circuit operation controller 122, as an error rate of the L-ch head switching period and an error rate of the R-ch head switching period. Track number detector 116 takes the L-ch and R-ch reproduced data as an input, detects track numbers corresponding to the synchronizing signal data of individual channels one after another, and outputs them to circuit operation controller 122 as L-ch track numbers and R-ch track numbers. Circuit operation controller 122 controls later described target tracking time difference detector 118, offset time difference controller 119 and switch 120 individually on the basis of the number of synchronizing signals in the L-ch and R-ch head switching periods, the error rates of the L-ch and R-ch head switching periods, and the L-ch and R-ch track numbers. Switch 120 is initially connected to "a" side by a command of the circuit operation controller, and sends zero (0) output to subtracter 121. Subtracter 121 thus outputs the synchronizing signal time difference, as it is output by sync-signal time difference detector 7, and sends it to capstan controller 151 as a synchronizing signal time difference error. Capstan controller 151 forwards magnetic tape 3 at a predetermined speed according to an FG signal output by FG detector 4 in synchronism with rotation of capstan motor 2. The individual heads thus reproduce data on the tracks numbered with a predetermined relation according to the data from circuit operation controller 122 (the predetermined relation means use of both reproducing head 101a and 101 to reproduce data on tracks of track number 0, and both reproducing head 101c and 101d to reproduce data on tracks of track number 1).

Capstan controller 151 executes tracking control by adjusting the speed of magnetic tape 3 in a manner to bring the synchronizing signal time difference error close to zero at all the time.

When switch 120 is connected to the "b" side, offset time difference controller 119 outputs a value produced by addition and/or subtraction of a number, which is gradually increased in a predetermined increment from zero according to a command of circuit operation controller 122, and causes subtracter 121 to keep providing the synchronizing signal time difference with predetermined values of offset. While the track numbers are in the predetermined relation with a condition of the above offsetting operation, target tracking time difference detector 118 detects a synchronizing signal time difference when any of the number of synchronizing signals and the error rate changes for the worse during the head switching period, takes the synchronizing signal time difference as a maximum time difference when it is in the positive side of offset, or as a minimum time difference when it is in the negative side of offset, and outputs one-half the sum of these detected values as a target tracking time difference.

Figure 13:
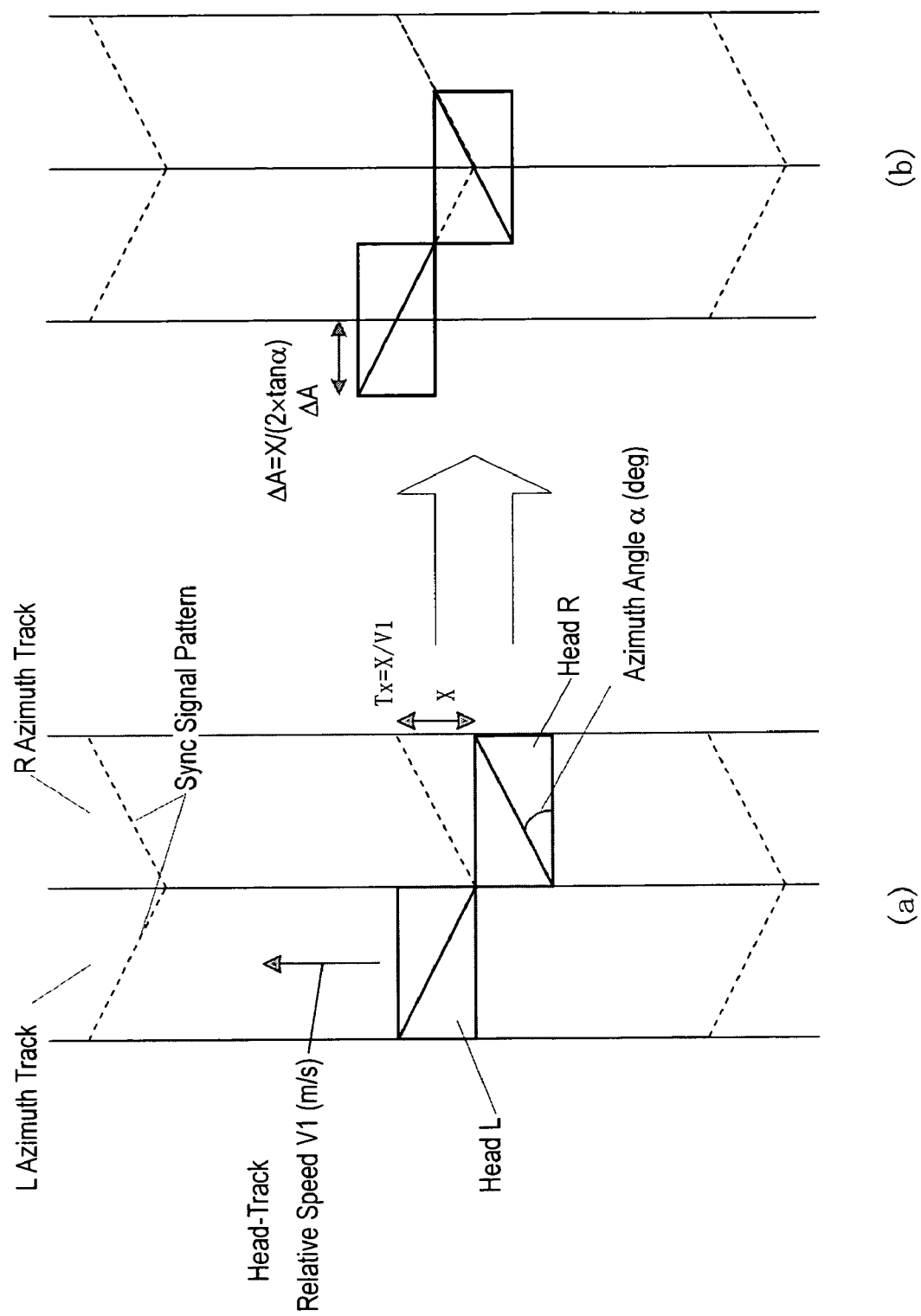
FIG. 13 is a diagrammatic drawing for explaining execution of off-track operation in the magnetic recording/reproducing apparatus according to the fourth exemplary embodiment.

Operations of the individual components are described next in more detail. FIG. 13 is a diagrammatic drawing for use to explain execution of off-track operation. In order to make the operation simple and comprehensible, FIG. 13(a) shows two tracks formed in a vertical direction, on which synchronizing signals of L-azimuth and R-azimuth are recorded in an equal height in the vertical direction, and head L of L-azimuth and head R of R-azimuth mounted in ideally aligned positions on the tracks but with different heights by a distance X with respect to each other in the vertical direction. Slanted dotted lines on the individual tracks indicate patterns of synchronizing signals (i.e. recorded loci). It is known that synchronizing signal time difference Tx is detected as X/V1, since the individual heads scan the tracks at a head-to-track relative speed of V1. Under the condition of such reproducing operation, the system of controllers shown in the previous FIG. 12 (wherein a delay time of reference reproduction divergence memory 110 is fixed to a value B, and switch 120 is connected to the "a" side) controls its operation in a manner to shift the tracking positions off the track centers by a distance ΔA (which equals) so that there is no time difference.

Figure 14:
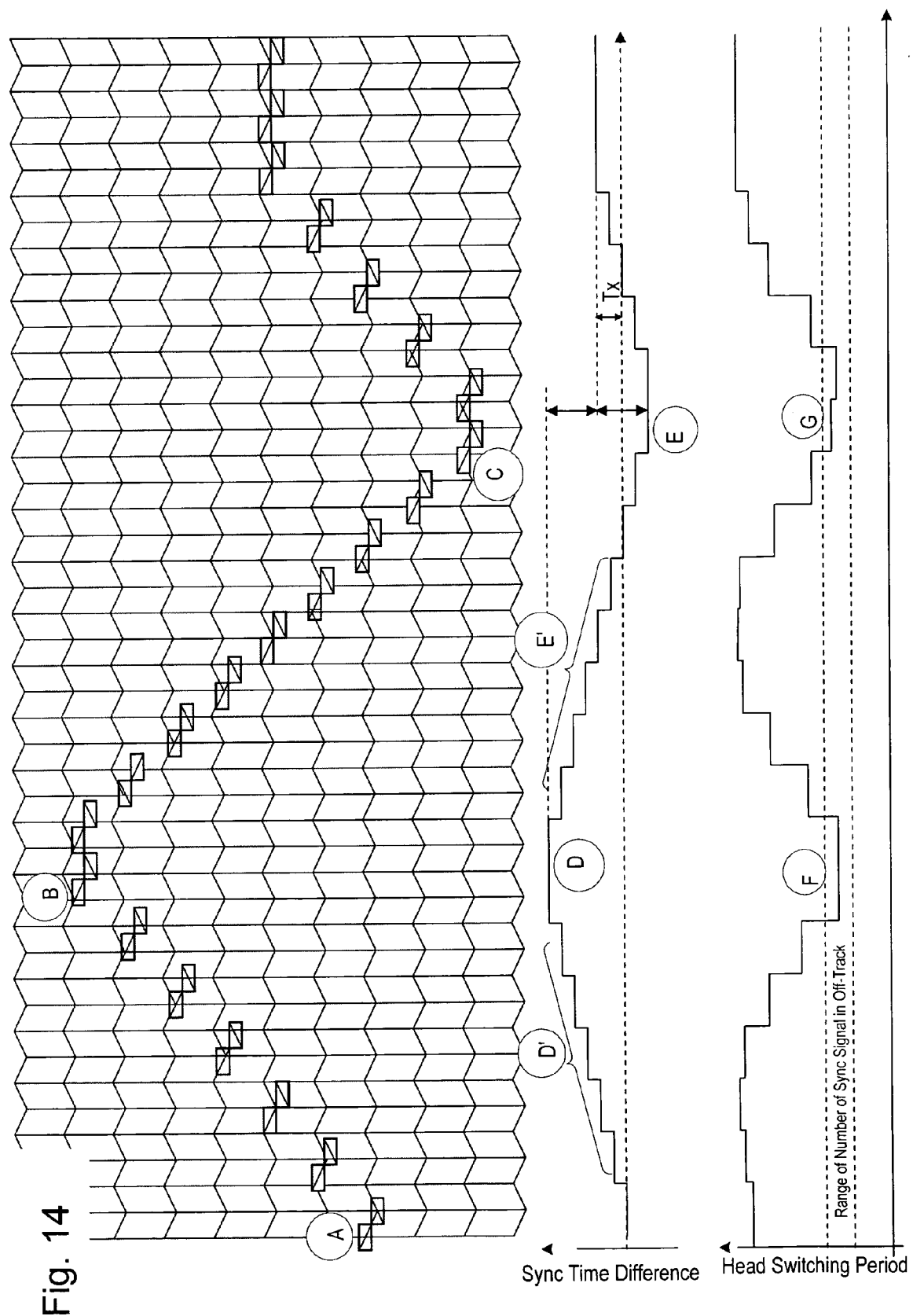
FIG. 14 is a diagrammatic illustration for explaining operation of detecting a target tracking time difference in the magnetic recording/reproducing apparatus according to the fourth exemplary embodiment.

FIG. 14 is a diagrammatic illustration for explaining operation of detecting a target tracking time difference, wherein mark (a) shows tracking positions of heads on the tracks as they moves with time, mark (b) shows a value of synchronizing signal time difference (i.e. an output of sync-signal time difference detector 7 of FIG. 12) under this tracking condition, and mark (c) is a value of the number of synchronizing signals (i.e. an output of sync-signal counter 114 of FIG. 12) in a head switching period, showing a degree of degradation of the reproducing condition at these points of time.

Assume now that the heads are tracking steadily in the relation shown in FIG. 13 (*b*) with respect to the tape being reproduced at the point A in FIG. 14. At this point of time, switch 120 is connected to the "b" side based on a command of circuit operation controller 122. Offset time difference controller 119 outputs an offset value by gradually increasing it to the positive side according to a command of circuit operation controller 122, to provide the synchronizing signal time difference with this offset via subtracter 121. This causes an output of sync-signal time difference detector 7 in FIG. 12 to shift gradually toward the positive side in a period shown by mark D' in FIG. 14(*b*). When the synchronizing signal time difference reaches to the point shown by mark D as the tracking condition shifts to a state of mark B in the figure, the number of synchronizing signals in the head switching period decreases to a level F into a range of detecting the off-track condition. As circuit operation controller 122 finds the level F under the condition of positive side offset, it sends the detected result as a flag data (i.e. the level F) to target tracking time difference detector 118. Based on the detected flag data, target tracking time difference detector 118 stores the synchronizing signal time difference of this point of time as a maximum off-track time difference. Upon completion of detecting the maximum off-track time difference, offset time difference controller 119 outputs another offset value by gradually subtracting it to the negative side based on a command of circuit operation controller 122, and provides the synchronizing signal time difference with an offset of the reverse side via subtracter 121. This causes the output of sync-signal time difference detector 7 in FIG. 12 to shift gradually toward the negative side in a period shown by mark E' in FIG. 14(*b*). When the synchronizing signal time difference reaches to the point shown by mark E as the tracking condition shifts to a state of mark C in the figure, the number of synchronizing signals in the head switching period decreases to a level G into a range of detecting the off-track condition. As circuit operation controller 122 finds the level G under the condition of negative side offset, it sends the detected result again as a flag data to target tracking time difference detector 118. Target tracking time difference detector 118 stores the synchronizing signal time difference of this point of time as a minimum off-track time difference based on this detected flag data. Upon completion of detecting the maximum and minimum off-track time differences, target tracking time difference detector 118 calculates one-half the sum of the maximum off-track time difference and the minimum off-track time difference. The calculated value corresponds to the time Tx in FIG. 13. At the same time, circuit operation controller 122 turns switch 120 into connection with "c" side to make subtracter 121 subtract the time Tx from the synchronizing signal time difference, thereby realizing the tracking in the ideal on-track position as shown in FIG. 13(*a*).

It is understood from the above description that a distance of the tracking movement required to detect the target tracking time difference is twice the track pitch or less according to the circuit configuration of this fourth exemplary embodiment. On the other hand, the method discussed in the third exemplary embodiment requires a moving distance of four times the track pitch in the worst case, because it obtains the maximum and the minimum off-track time differences by advancing magnetic tape 3 at a speed 10/9 (ten-ninth) of the normal speed. According to this exemplary embodiment, the target tracking time difference can be detected within one-half or less of the time needed in the third exemplary embodiment.

Generally, in the tape replay, there are variations in contacting condition of the heads to the magnetic tape and amount of dropouts, because of the changes in the cylinder rotation, tape feeding, tape tension, and so forth. Therefore, the reproducing condition being detected by synchronizing signal counter 114 changes moment by moment even under the same tracking condition, and detected result of the target tracking time difference also varies as a result, thereby giving rise to a problem that a desired detecting accuracy is not obtainable. In this case, target tracking time difference detector 118 stores a value given by averaging the synchronizing signal time difference D in the tracking position B of FIG. 14 for a predetermined number of times, as a mean maximum off-track time difference, and also another value given by averaging the synchronizing signal time difference E in the tracking position C of FIG. 14 for a predetermined number of times, as a mean minimum off-track time difference. Target tracking time difference detector 118 then produces one-half the sum of these mean maximum and mean minimum off-track time differences as a target tracking time difference to be output. Variations in the detected results of the target tracking time differences can be thus alleviated, and the desired detecting accuracy obtained in this manner. It is also evident with the method of this exemplary embodiment that a time required to detect and obtain the averaged synchronizing signal time difference is shorter as compared to that of the third exemplary embodiment. The reason is that the method of this exemplary embodiment needs the magnetic tape to move only a distance twice that of the track pitch or less, whereas the third exemplary embodiment requires a distance four times that of the track pitch multiplied by the number of times necessary to obtain the mean value.

Although what has been discussed above is an example in which a number of synchronizing signals detected in each of the head switching periods by sync-signal counter 114 is used as means of detecting the reproducing condition, it may be substituted by an error rate detected in each of the head switching periods by error rate detector 115 of FIG. 12. Since degradation of the reproducing condition in an off-track period can be detected more precisely than the use of sync-signal counter 114, even a small level of off-track can allow detection of the degradation in this case, thereby obtaining a target tracking time difference within a short period of time.

In other words, the fourth exemplary embodiment makes possible to detect the target tracking time difference highly accurately within a short time.

Description is provided next of a number of adjustments performed with a reference tape in the magnetic recording/reproducing apparatus of this exemplary embodiment.

It is assumed that magnetic tape 3 shown in FIG. 12 represents a reference tape having necessary data recorded by a standard apparatus. The data is reproduced, and a target tracking time difference is detected according to the method described above. It is assumed in this example that a delay time of L-ch sync-signal delay circuit 108 is B, and a delay time of R-ch sync-signal delay circuit 109 is 2B. Target tracking time difference is not detected if mounting heights and staggers of reproducing heads of the apparatus under the adjustments are equivalent to those of the standard apparatus. Therefore, it is known that the target tracking time difference detected by reproduction of the reference tape corresponds to an amount of mounting deviation of the reproducing head. The target tracking time difference of each head is forwarded to reference reproduction divergence memory 110 via circuit operation controller 122, where it is stored as a reference reproduction divergent time. R-ch sync-signal delay circuit 109 adjusts a delay time of R-ch synchronizing signal (pulse) by subtracting the reference reproduction divergent time for each head from the delay time 2B. In other words, this makes an adjustment possible to eliminate the target tracking time difference when the reference tape is replayed even if mounting positions of the reproducing heads are different from those of the standard apparatus. After the reproducing side is adjusted in the manner as described above, magnetic tape 3 is replaced with an unrecorded magnetic tape, and data output by L-ch data delay circuit 103 and R-ch data delay circuit 104 are reproduced with the reproducing heads while recording them on the magnetic tape with recording heads. However, a delay time of R-ch data delay circuit is 2B at this time. Since a synchronizing signal time difference output by sync-signal time difference detector 7 in this operation represents a divergence of recording head stagger, the synchronizing signal time difference for each head is forwarded via circuit operation controller 122 to reference recording divergence memory 105 for storage as a reference recording divergence time (the reference recording divergence time becomes zero if the recording head stagger is equivalent to that of the standard apparatus.). R-ch data delay circuit 104 takes a delay time by subtracting the reference recording divergence time for each head from the delay time 2B. In other words, this makes an adjustment possible to allow the apparatus capable of recording the data with same time difference of the synchronizing signal as the reference tape even if the head stagger of the recording heads are different from those of the standard apparatus.

Described above in the fourth exemplary embodiment (FIG. 12) is the magnetic recording/reproducing apparatus equipped with recording heads and reproducing heads. The method discussed above in which a delay time of the R-ch data delay circuit is set by storing a reference recording divergence is obviously applicable to any magnetic recording/reproducing apparatus that uses all of recording heads 100*a*, 100*b*, 100*c* and 100*d* to also serve as reproducing heads.

The above adjustments are carried out before apparatuses are shipped from the factory, to eliminate variations in time difference of synchronizing signals among the individual units due to variations in positions of heads mounted on rotary drums. The embodiment discussed here improves interchangeability of apparatuses and reproduction performance, since it can limit variations in time difference of the synchronizing signals among recorded magnetic tapes produced in the market, other than those attributable to changes of the apparatuses and tapes over time and changes of the environmental condition.

(Fifth Exemplary Embodiment)

Figure 15:
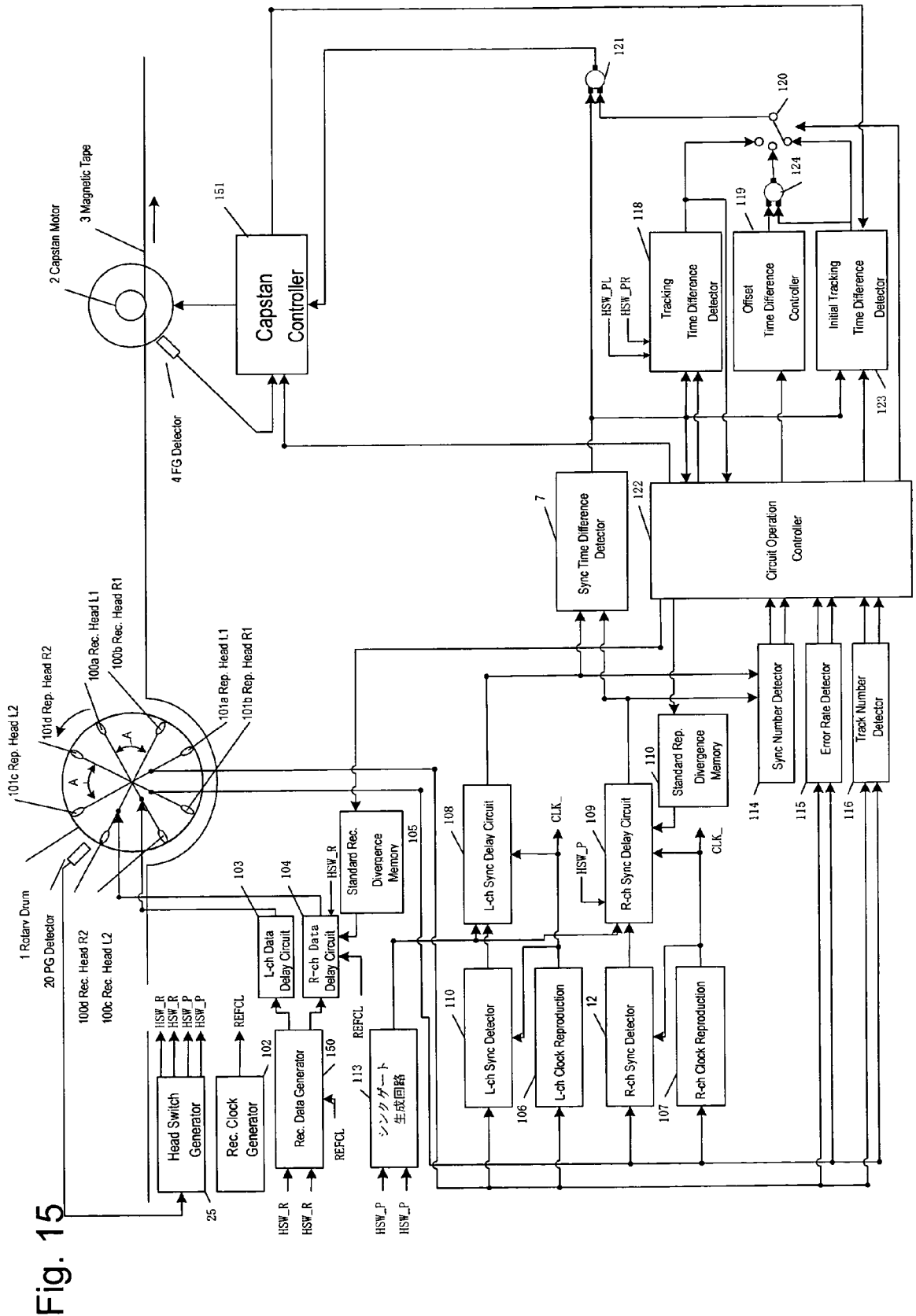
FIG. 15 is a block diagram of a magnetic recording/reproducing apparatus according to a fifth exemplary embodiment of the present invention.

FIG. 15 is a block diagram of a magnetic recording/reproducing apparatus according to the fifth exemplary embodiment. Components of like functions as those of the magnetic recording/reproducing apparatus of the fourth exemplary embodiment are designated with like reference numerals, and their details will therefore be skipped. In FIG. 15, initial tracking time difference detector 123 and adder 124 are added as new components to the structure of the fourth exemplary embodiment. Initial tracking time difference detector 123 has a function of detecting an initial tracking time difference from a synchronizing signal time difference input by sync-signal time difference detector 7 based on a data from capstan controller 151 and a command of circuit operation controller 122. At the start of replaying magnetic tape 3, switch 120 is connected to "a" side by a command of circuit operation controller 122, and capstan controller 151 controls tracking in a manner so that an output of sync-signal time difference detector 7 becomes equal to the initial tracking time difference. After a steady tracking is established, a command of circuit operation controller 122 turns switch 120 into connection with "b" side. Offset time difference controller 119 gives an offset to the initial tracking time difference via adder 124, so as to perform an offsetting operation in the same manner as described in the fourth exemplary embodiment. When target tracking time difference detector 118 detects a target tracking time difference in the course of this process, a command of circuit operation controller 122 turns switch 120 into connection with "c" side to proceed into a normal state of on-tracking operation.

Figure 16:
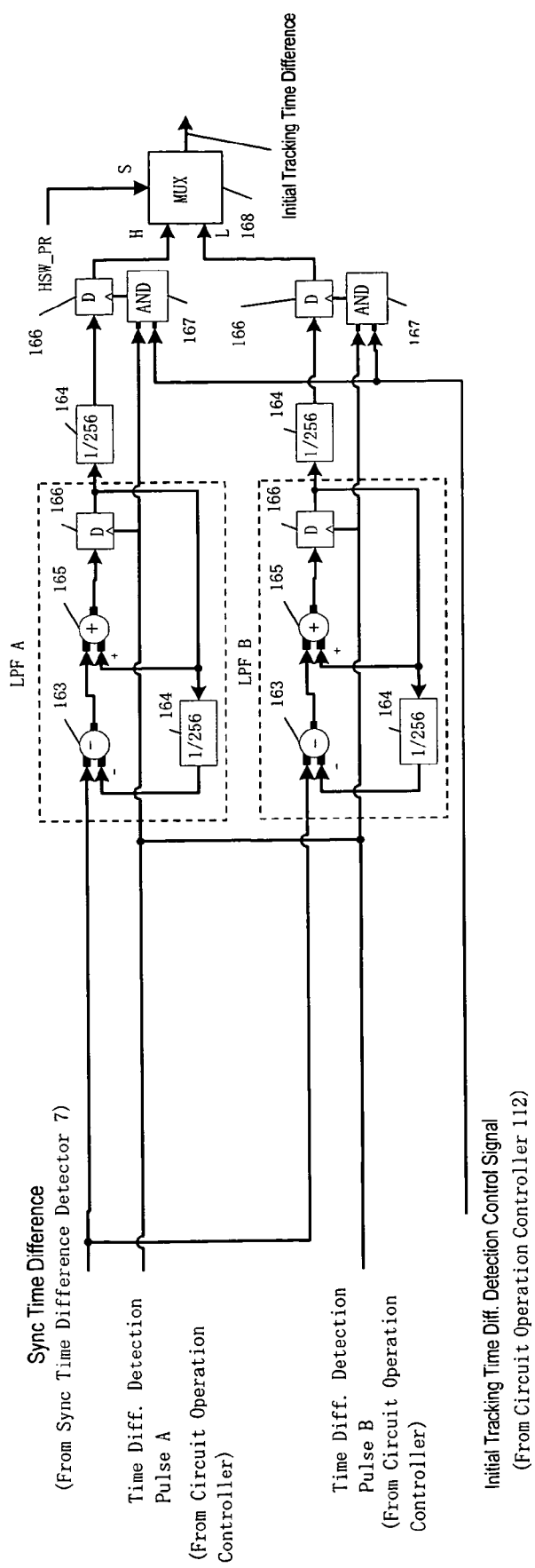
FIG. 16 is a block diagram of an initial tracking time difference detector of the magnetic recording/reproducing apparatus according to the fifth exemplary embodiment.

FIG. 16 is a block diagram depicting an example of initial tracking time difference detector. The synchronizing signal time difference is input from sync-signal time difference detector 7. A time difference detection pulse A is a holding pulse for holding the last or present individual synchronizing signal time differences at a time a reproducing condition is satisfactory in a predetermined track number during a period wherein a head switching signal is at a high level. A time difference detection pulse B is a holding pulse for holding the last or present individual synchronizing signal time differences at a time a reproducing condition is satisfactory in a predetermined track number during a period wherein a head switching signal is at a low level. Initial tracking time difference detection control signals are control signals, each of which changes to a high level only for a period necessary to detect an initial tracking time difference, and they are each output by circuit operation controller 122. (Here, satisfactory reproducing condition means that either a number of the synchronizing signals output by sync-signal counter 114 shown in FIG. 15 is equal to a predetermined number or more, or an error rate output by error rate detector 115 shown in FIG. 15 is equal to a predetermined level or less.)

Each of subtracters 163 subtracts a negative side value from a positive side value, and each of adders 165 adds both inputs. Each of dividers 164 divides its input by a predetermined divisor. Each of delay elements 166 latches its input with a predetermined pulse. AND element 167 ANDs both of its inputs. Multiplexer 168 selects a high side input when control terminal S is at a high level, and a low side input when the control terminal S is at a low level. Each combination of these components 163, 164, 165 and 166 in this drawing constitute a low-pass filter of a predetermined time constant (hereinafter "LPF").

When the reproducing condition is satisfactory, LPF "A" having the above structure of FIG. 16 takes synchronizing signal time differences in a predetermined track number during a period in which a head switching signal is at a high level, and averages them with the predetermined time constant. LPF "B" also takes synchronizing signal time differences in a predetermined track number during a period in which a head switching signal is at a low level, and averages them with the predetermined time constant in the like manner.

Figure 17:
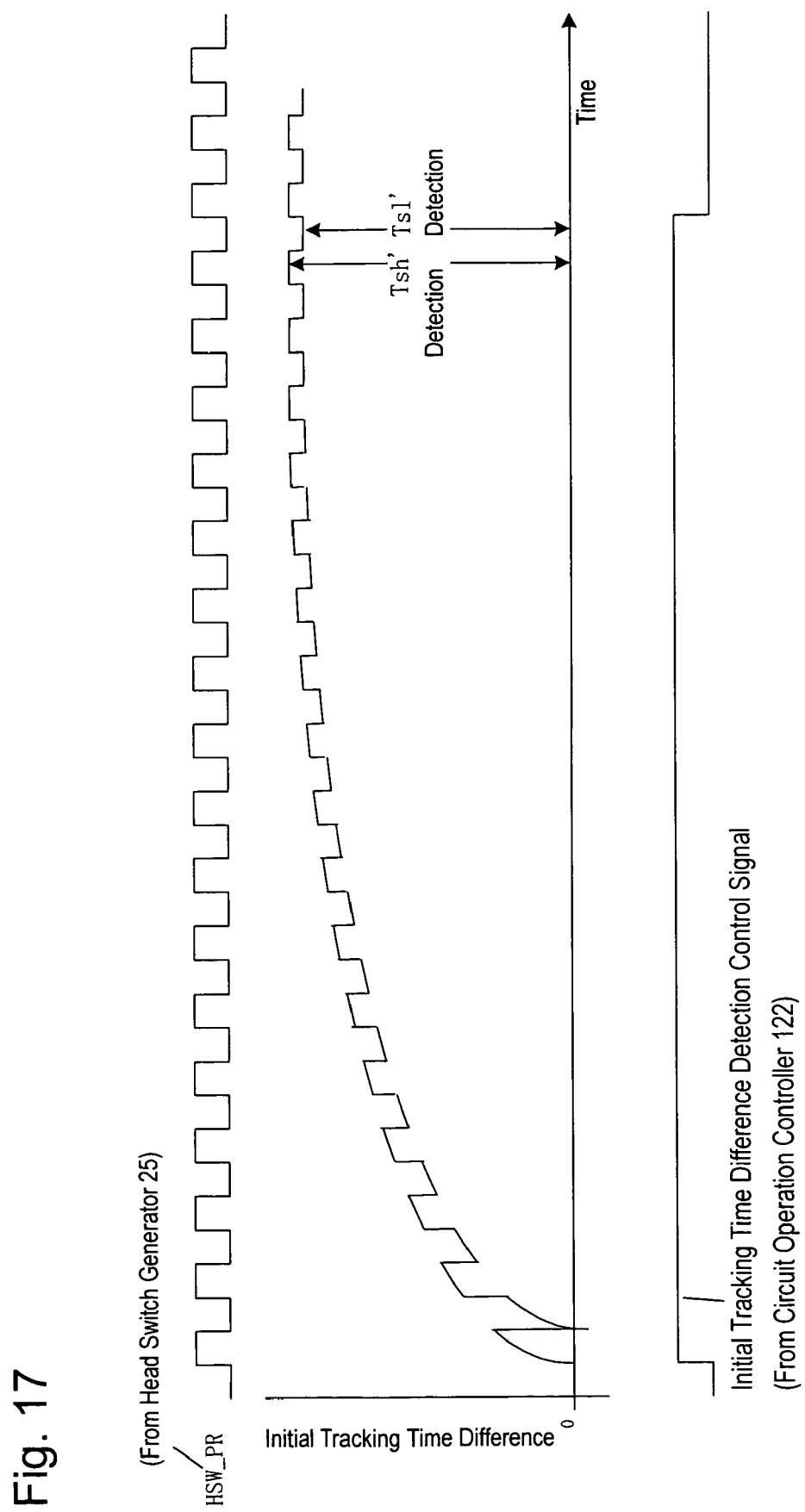
FIG. 17 is a diagrammatic illustration for explaining an operation of the magnetic recording/reproducing apparatus according to the fifth exemplary embodiment.

There are cases that the system of the fourth exemplary embodiment (i.e. switch 120 in FIG. 12 with its "a" side fixes to zero level) is unable to ensure the normal tracking due to large time difference of the synchronizing signals because of deterioration and the like of a recorded tape over time. That is, when a tape being replayed carries synchronizing signal time differences shifted to Tsh at the high side and Tsl at the low side, initial tracking time differences Tsh' and Tsl' gradually reach values close to Tsh and Tsl, as shown in FIG. 17. After a sufficient time is elapsed beyond the predetermined time constant, an initial tracking time difference detection control signal turns into a low level so as to hold the initial tracking time differences to Tsh' and Tsl' respectively. These initial tracking time differences Tsh' and Tsl' are input to subtracter 121 via switch 120, to ensure positive tracking at a given off-track position, although it is not an ideal on-track condition. In addition, since offset time difference controller 119 uses the synchronizing signal time differences Tsh and Tsl for its offset operation at the same time, it can initiate the offset operation steadily.

Figure 18:
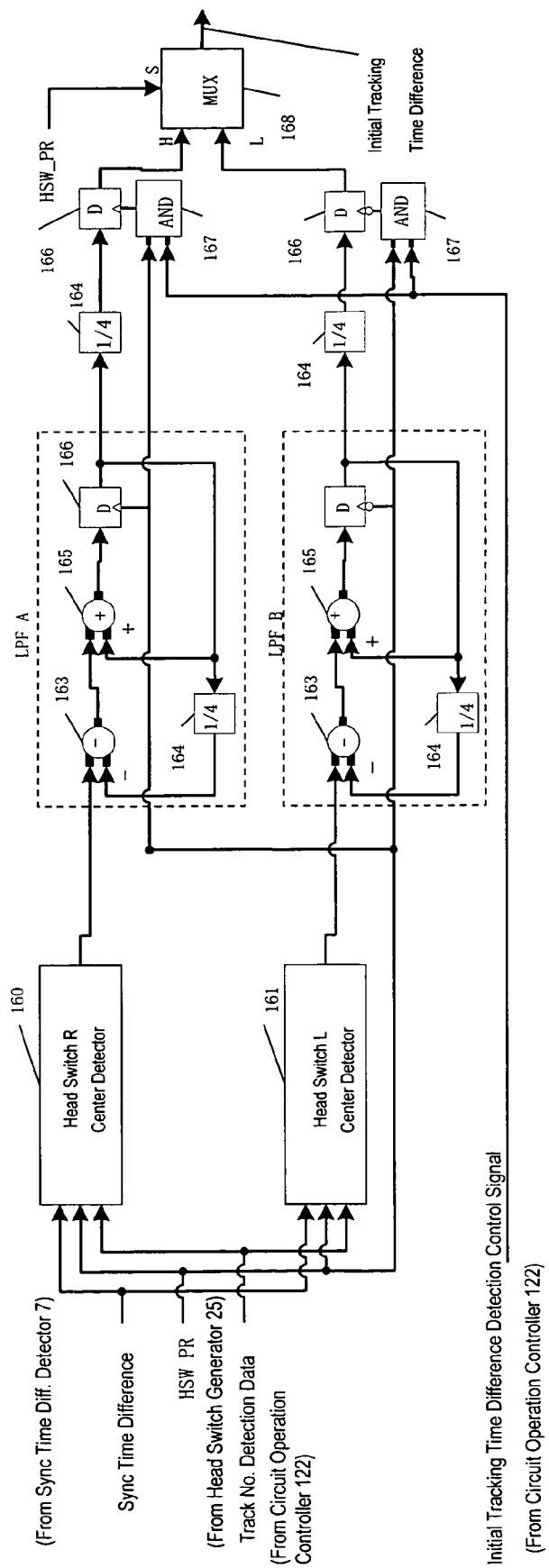
FIG. 18 is a block diagram of another initial tracking time difference detector of the magnetic recording/reproducing apparatus according to the fifth exemplary embodiment.
Figure 19:
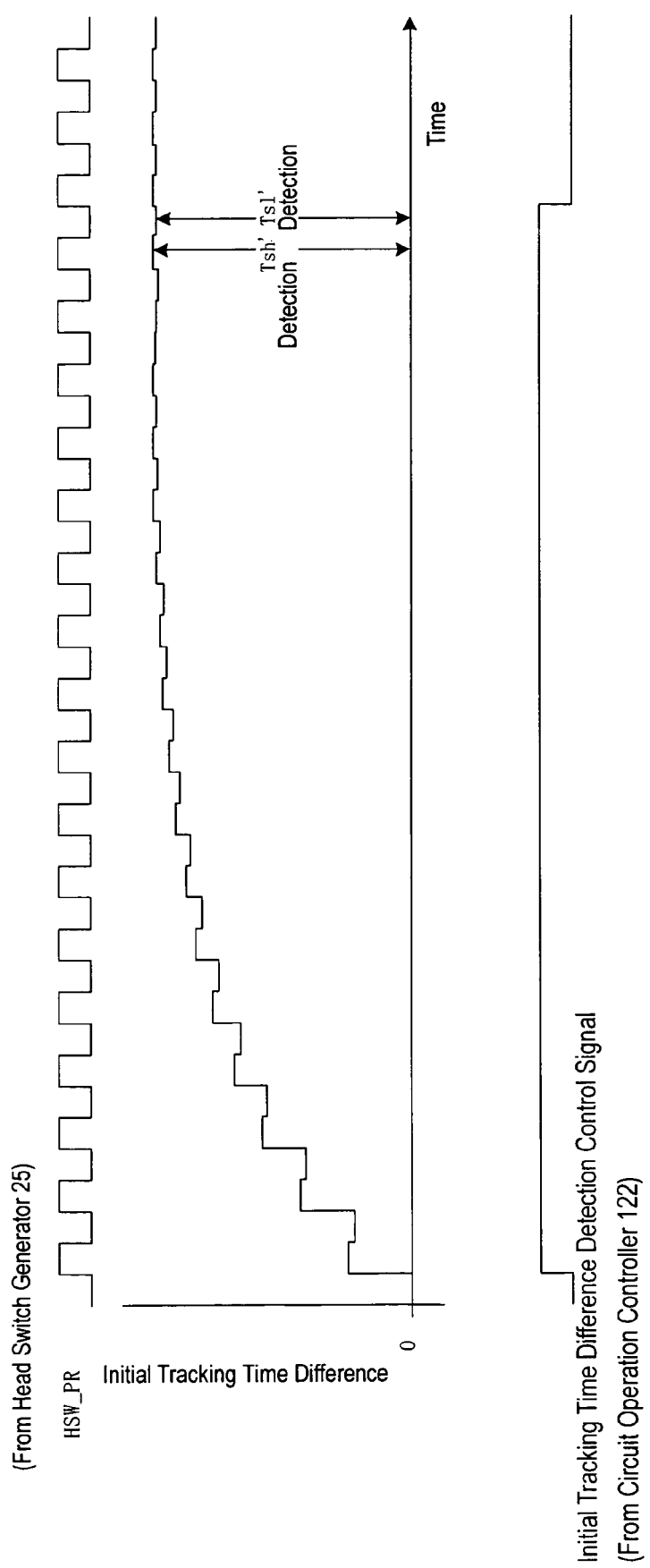
FIG. 19 is a diagrammatic illustration used to explain an operation of the magnetic recording/reproducing apparatus according to the fifth exemplary embodiment.

FIG. 18 shows a block diagram of another embodied example of initial tracking time difference detector 123. In FIG. 18, description will not be provided of components of the like reference numerals as those of FIG. 16, as they are operationally identical. According to a track number determination data input by circuit operation controller 122, head switch H-side center detector 160 detects a maximum value and a minimum value of one cyclic period of head switching signal among the synchronizing signal time differences during a period wherein a tape advancing speed is slower than the normal speed and a head switching signal is at a high level, in a predetermined track number, and outputs a value one-half the sum of these maximum and minimum values. Head switch L-side center detector 161 also operates in the same manner. Initial tracking time differences in this operation gradually reach values close to Tsh and Tsl with every head cycle, as shown in FIG. 19, and in the like manner as described in the previous example. After a sufficient time is elapsed beyond the predetermined time constant, an initial tracking time difference detection control signal turns into a low level so as to hold the initial tracking time differences to Tsh' and Tsl' respectively. In the like manner as the previous example, these initial tracking time differences Tsh' and Tsl' are input to subtracter 121 via switch 120, to ensure positive tracking at a given off-track position, although it is not an ideal on-track condition. In addition, since offset time difference controller 119 uses the synchronizing signal time differences Tsh and Tsl for its offset operation at the same time, it can initiate the offset operation steadily.

Although this structure increases a scale of the circuitry, as shown in FIG. 17, a significant advantage is its ability of detecting the initial tracking time difference within an initial start-up period before a rotational speed of the rotary drum and a tape forwarding speed reach their regular speeds while the reproducing heads are scanning the tracks diagonally. In other words, it can enter into the offsetting operation more quickly as compared with the other embodied example shown in FIG. 16. If the magnetic recording/reproducing apparatus is a type that plays a cassette tape and the like, it can further shorten the time from tape loading to data reproduction.

Even though the magnetic recording/reproducing apparatus is adjusted for recording and reproducing function with a reference tape in the factory prior to the shipment, as described in the fourth exemplary embodiment, it is likely that there are many recorded tapes in consumers hands with such conditions that synchronizing signal time differences are increased considerably due to deterioration over time such as expansion of tapes.

According to this fifth exemplary embodiment, provision of the initial tracking time difference detector enables the apparatus to ensure stable initial tracking and to start the offset operation smoothly by way of detecting an initial tracking time difference at the start of a reproduction operation (i.e. a transition period of the operation) instead of using a fixed value of initial target tracking time difference.

(Sixth Exemplary Embodiment)

Figure 20:
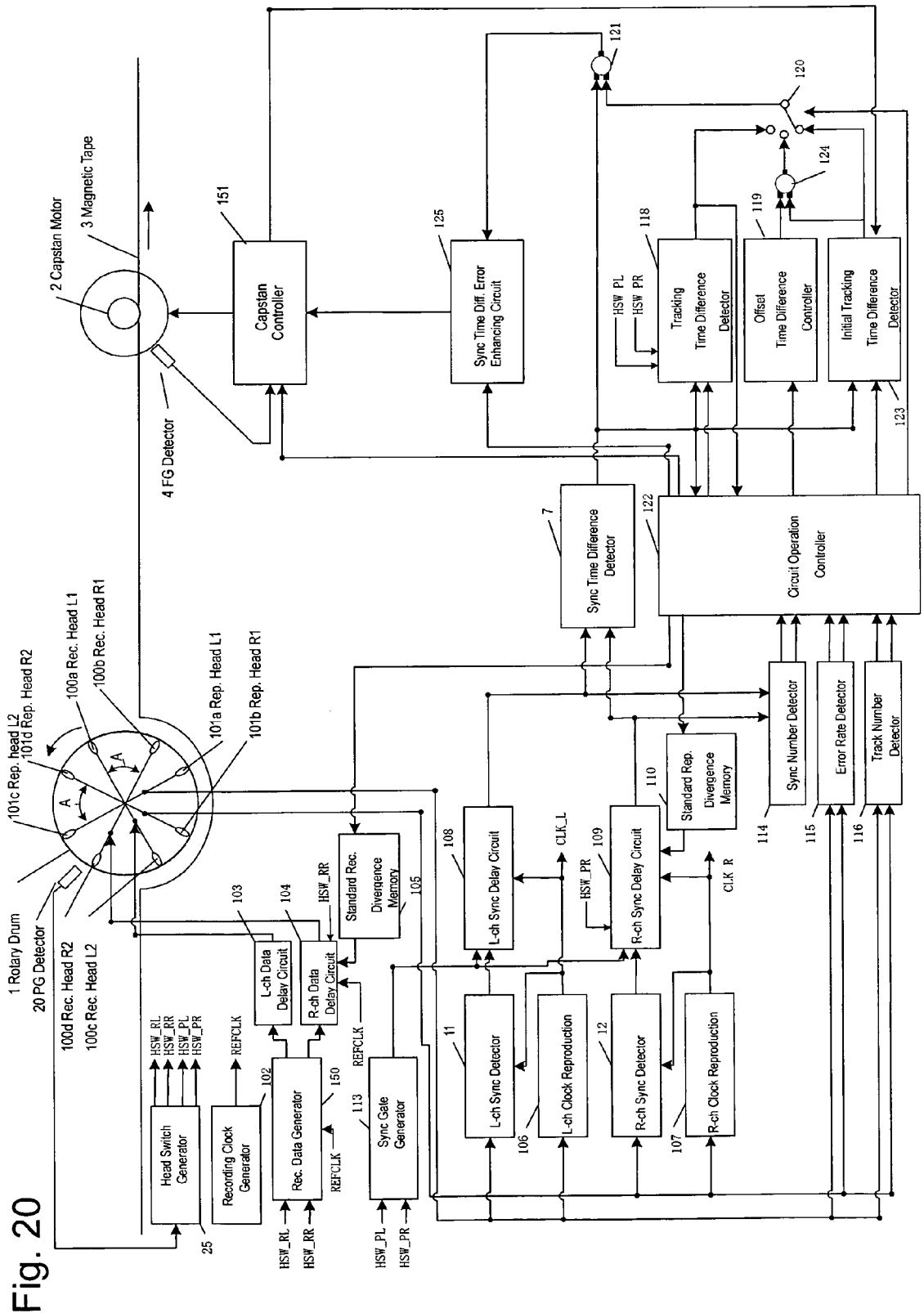
FIG. 20 is a block diagram of a magnetic recording/reproducing apparatus according to a sixth exemplary embodiment of the present invention.

FIG. 20 is a block diagram of a magnetic recording/reproducing apparatus according to the sixth exemplary embodiment. Components of like functions as those of the magnetic recording/reproducing apparatus of the fifth exemplary embodiment are designated with like reference numerals, and their details are therefore skipped. Sync-signal time difference enhancing circuit 125 replaces a synchronizing signal time difference signal from subtracter 121 with a predetermined value based on a data received from circuit operation controller 122, and outputs it to capstan controller 151 instead of the synchronizing signal time difference signal.

During an offsetting operation toward the positive side, if offset time difference controller 119 gives an offset excessively to such a degree that synchronizing signals are not detectable and a synchronizing signal time difference is not obtainable, sync-signal time difference enhancing circuit 125 brings the tracking back to the negative side by delivering a predetermined positive value for interpolation to capstan controller 151. Likewise, in an offsetting operation toward the negative side, if offset time difference controller 119 gives an offset excessively to such a degree that the synchronizing signals are not detectable and the synchronizing signal time difference is not obtainable, sync-signal time difference enhancing circuit 125 brings the tracking back to the positive side by delivering a predetermined negative value for interpolation to capstan controller 151. In addition, sync-signal time difference enhancing circuit 125 performs a similar replacement operation when the track number data does not agree to a predetermined relation with respect to a synchronizing signal time difference even if the synchronizing signal time difference is obtained.

The structure described above makes the apparatus capable of maintaining stable tracking by an appropriate interpolation even under unstable tracking condition when the synchronizing signal time difference is not obtainable during the offsetting operation.

In addition, when sync-signal time difference enhancing circuit 125 performs its function of interpolation, it is desirable that offset time difference controller 119 also functions at the same time to subtract a predetermined value from the offset value when it is in the positive side, or to add a predetermined value to the offset value when it is in the negative side, to stabilize the offsetting operation.

(Seventh Exemplary Embodiment)

Figure 21:
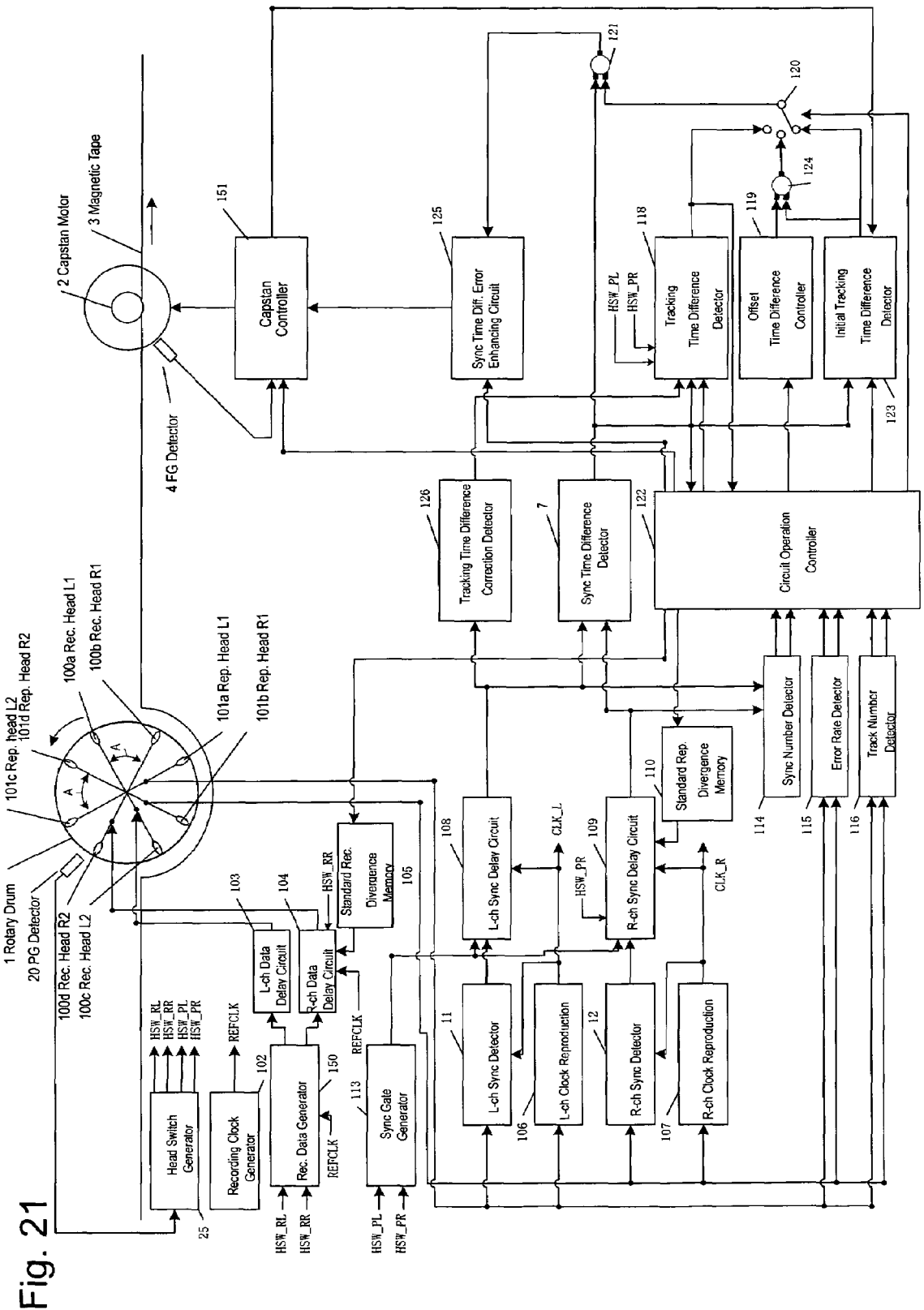
FIG. 21 is a block diagram of a magnetic recording/reproducing apparatus according to a seventh exemplary embodiment of the present invention.

FIG. 21 is a block diagram of a magnetic recording/reproducing apparatus according to the seventh exemplary embodiment. Components of like functions as those of the magnetic recording/reproducing apparatus of the sixth exemplary embodiment are designated with like reference numerals, and their details are therefore skipped. Tracking time difference correction detector 126 detects a correction value for correcting a target tracking time difference detected by target tracking time difference detector 118 based on a delayed L-ch synchronizing signal pulse output by L-ch sync-signal delay circuit 108.

Figure 22:
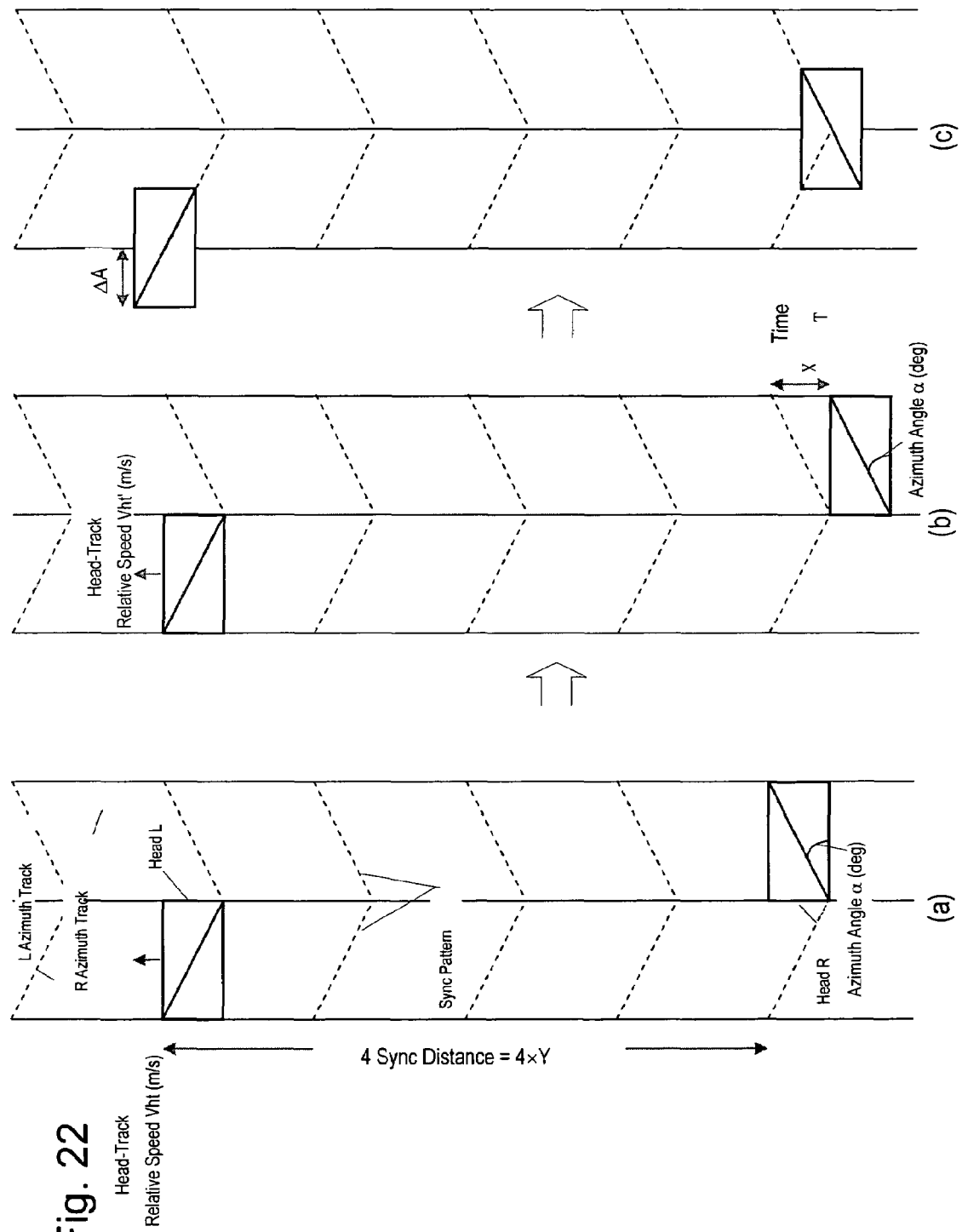
FIG. 22 is a diagrammatic drawing used to explain an operation of the magnetic recording/reproducing apparatus according to the seventh exemplary embodiment.

FIG. 22 is a diagrammatic illustration for explaining an operation of tracking time difference correction detector 126. Assuming here that FIG. 22(*a*) represents a relation between tracks and heads at a point of time when target tracking time difference detector 118 detects a target tracking time difference. It is obvious from the figure that the target tracking time difference is zero at this point of time. Head L and head R are mounted apart with a distance, or a head stagger, corresponding to four synchronizing signals (i.e. 4×Y). However, rotary drum 1 expands with temperature rise of the apparatus, which results in an increase in its diameter. A relation between the heads and the tape in this state is shown in FIG. 22(*b*). Because an outer perimeter of the drum expands due to the thermal expansion, this figure (b) shows a distance X as an amount of increase in the head stagger from the head L to the head R. This change of distance X causes a divergence Tx in synchronizing time difference in a proportional ratio, which can result in an off-track by a deviation of ΔA as shown in FIG. 22(*c*).

Descriptions are given now of the individual equations under this state, as shown in Formulae 22. Equation 22(*a*) gives a circumferential velocity of the rotary drum, and equation 22(*b*) gives a track angle. When a tape is advanced at speed Vt, then a head-to-tape relative speed is given by the equation 22(*c*), where β represents (sin θL/sin θt). Similarly, a head-to-tape relative speed under the condition of FIG. 22(*b*) is given by the equation 22(*d*) when (sin θL/sin θt) is denoted by β, considering that it is about equal to (sin θL/sin θt'), since the change θt is small. Furthermore, distance X of FIG. 22(*b*) is given by equation 22(*e*), and a synchronizing signal time difference resulting from the distance X is given by equation 22(*f*).

As is known here from the equation 22(*f*), time difference Tx is a value derived by subtracting a time required to reproduce data over a length of four synchronizing signals (a time duration corresponding to a distance of the head stagger) in FIG. 22(*b*) from a time required to reproduce data over a length of four synchronizing signals (a time duration corresponding to a distance of the head stagger) in FIG. 22(*a*).

Tracking time difference correction detector 126 has the following function and it operates in a manner as described hereinafter. First, it measures and stores, as an initial stagger distance reproduction time, a time required to reproduce the data over the length of four synchronizing signals (4Y/Vht), when target tracking time difference detector 118 detects a target tracking time difference (at the point of time represented by FIG. 22(*a*)). It detects a change in diameter of the rotary drum as it varies due to a thermal effect, by measuring a value (4Y/Vht') from time to time. It then outputs the time difference Tx given by the equation 22(*f*) to target tracking time difference detector 118, which in turn makes correction of the target tracking time difference detected previously.

When detecting a stagger distance reproduction time, i.e. the time required to reproduce data over a number of synchronizing signals corresponding to a distance of the head stagger, it is desirable to use a low-pass filter or the like component to average changes of the stagger distance reproduction time with a predetermined time constant, taking into consideration that the rotary drum has rotational variations, thereby improving a detecting accuracy.

According to this exemplary embodiment, the above-described structure can maintain optimum tracking by automatically following variations in the target tracking time difference, even if they occur after detection of the target tracking time difference due to thermal expansion and contraction of the rotary drum with changes in temperature of the apparatus.

Description is given next of an operation for splice recording according to this seventh exemplary embodiment.

For video tape recorders, there is a function generally called an assemble editing for making a splice recording on a recorded tape. There is also another function generally called appending for tape streamers. It is important for these functions not to erroneously erase such data as image, voice and other information that are already recorded on the tape, and not to cause a tracking disorder at any point of splice when the splice-recorded tape is replayed. Referring to the accompanying drawings, description is provided hereinafter of a method of satisfying these conditions.

Figure 23:
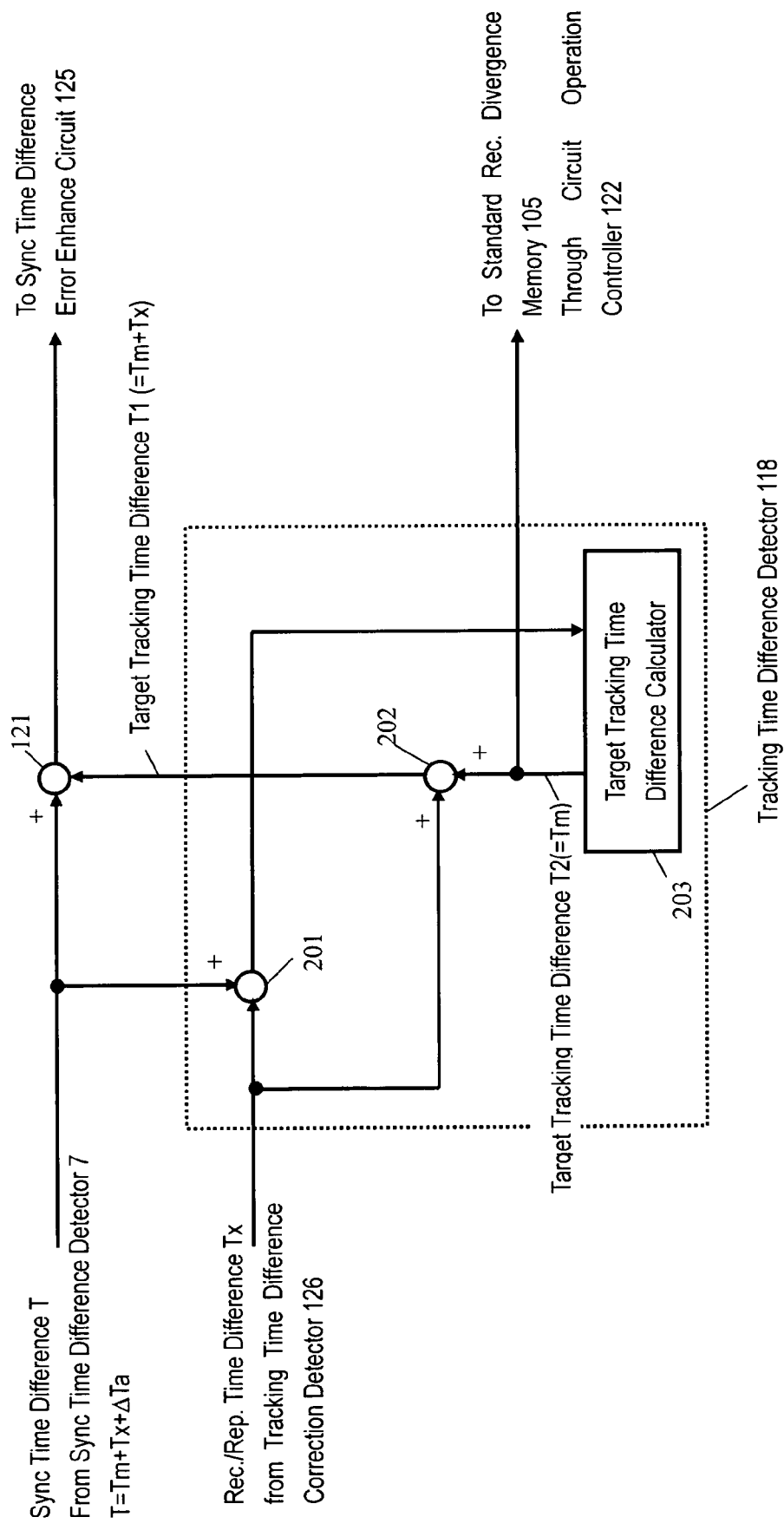
FIG. 23 is a diagrammatic illustration used to explain an operation of correcting a record timing of synchronizing signal for a splice recording in the magnetic recording/reproducing apparatus according to the seventh exemplary embodiment.
Figure 24:
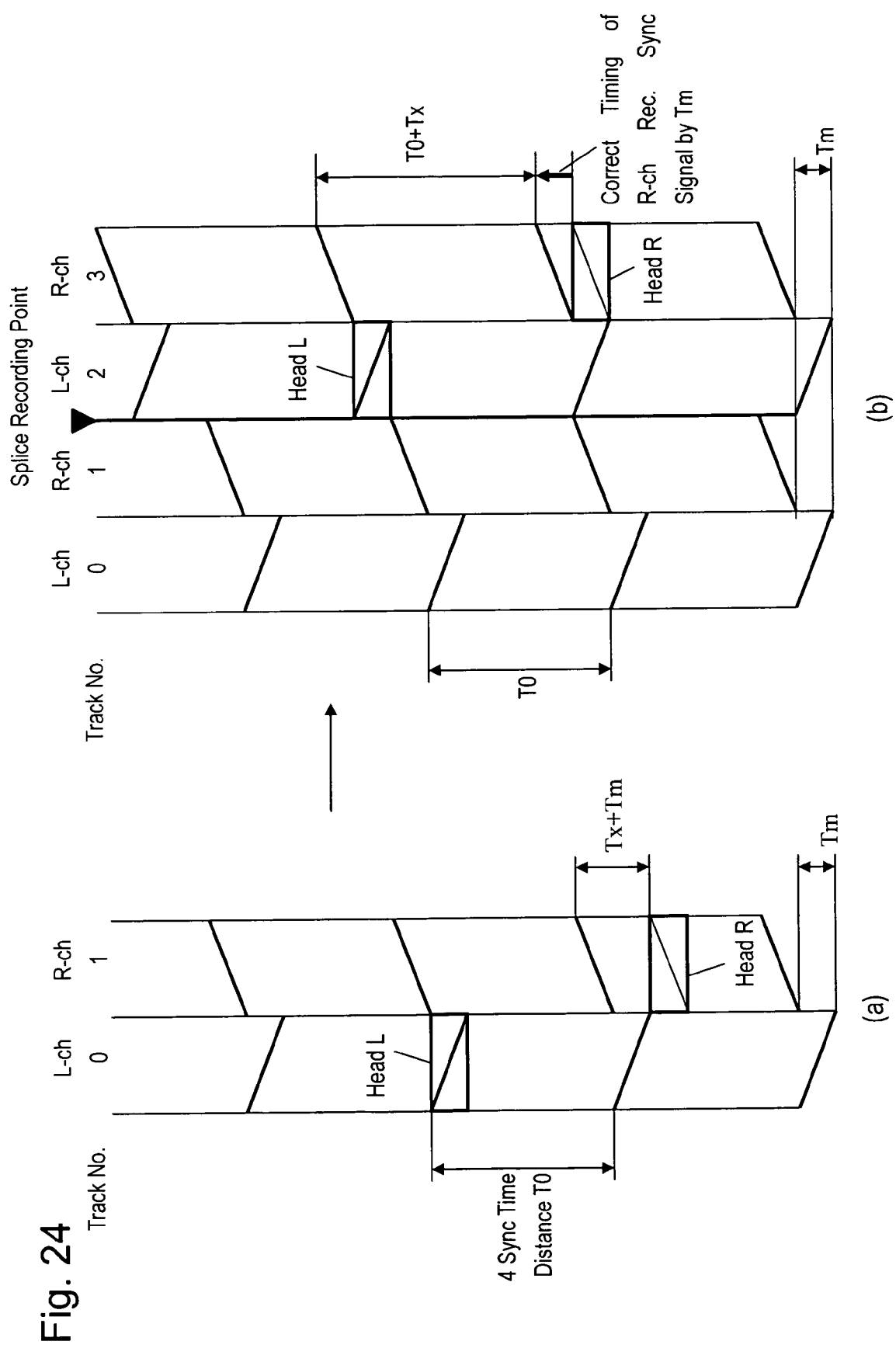
FIG. 24 is a diagrammatic drawing showing track patterns in the splice recording in the magnetic recording/reproducing apparatus according to the seventh exemplary embodiment.

FIG. 23 is a diagrammatic illustration for use to explain an operation of correcting a timing of synchronizing signal when making a splice recording. Subtracter 201 subtracts a recording/reproducing time difference output by tracking time difference correction detector 126 from a synchronizing signal time difference output by sync-signal time difference detector 7. Adder 202 adds a target tracking time difference T2 output by target tracking time difference calculator 203 to a recording/reproducing time difference output by tracking time difference correction detector 126. Target tracking time difference calculator 203 calculates a target tracking time difference based on an output of subtracter 201. Subtracter 121 subtracts a target tracking time difference T1 output by adder 202 from the synchronizing signal time difference output by the sync-signal time difference detector 7, and outputs it as a tracking error data to sync-signal time difference enhancing circuit 125. FIG. 24 is a diagrammatic drawing showing track patterns in the splice recording, wherein FIG. 24(*a*) is a diagram showing positional relations of heads with respect to tracks during a pre-rolling operation, and FIG. 24(*b*) is another diagram showing positional relations of the heads with respect to the tracks during a splice recording.

In an operation of the splice recording, it is necessary to run for reproduction to a point where the splice recording is made. This reproducing operation is hereinafter referred to as pre-rolling operation. Description is now provided of the pre-rolling operation of this exemplary embodiment by referring to FIG. 21, FIG. 23, and FIG. 24. During the pre-rolling operation, sync-signal time difference detector 7 outputs a time difference T between reproduced L-ch synchronizing signal and R-ch synchronizing signal. Although there is a shift Tm of the synchronizing signals between L-ch track and R-ch track, as shown in FIG. 24(*a*), and head L and head R are separated in a timing distance of T0 under the normal condition, this example shows that the timing distance has been changed to T0+Tx due to thermal expansion of rotary drum 1. When magnetic tape 3 is replayed, sync-signal time difference detector 7 outputs synchronizing signal time difference T. Assuming that there is a synchronizing signal time difference ΔTa due to a tracking deviation at this time, their relations can be expressed by T=Tm+Tx+ΔTa. Further, tracking time difference correction detector 126 outputs recording/reproducing time difference Tx caused by the thermal expansion of rotary drum 1. Value Tm+ΔTa is input to target tracking time difference calculator 203 inside target tracking time difference detector 118, and it is subjected to a filtering process by being passed through a low-pass filter inside thereof, which obtains value Tm as target tracking time difference T2. In addition, adder 202 adds recording/reproducing time difference Tx and target tracking time difference T2 (=Tm), and outputs a value Tm+Tx as target tracking time difference T1. This target tracking time difference T1 (=Tm+Tx) is subtracted from synchronizing signal time difference T by subtracter 121 to obtain an accurate tracking divergent component ΔTa, which is then output to sync-signal time difference enhancing circuit 125. Accordingly the tracking control can be carried out steadily during the pre-rolling operation even if there is a deviation in time difference between L-ch and R-ch synchronizing signals in reproduction due to thermal expansion of the rotary drum, deviation of the recorded synchronizing signals, and so forth.

Description is provided next pertaining to an operation of shifting from the pre-rolling to a splice recording. As previously described, reference recording divergence memory 105 has a time data stored in advance for adjustment of a delay time of recording data for R-ch with respect to L-ch in order to record the data with a time difference of synchronizing signal equal to that of the reference tape. Here, the target tracking time difference T2 (=Tm) obtained during the pre-rolling operation period is output from target tracking time difference calculator 203 inside target tracking time difference detector 118 to reference recording divergence memory 105 via circuit operation controller 122. It then makes a correction of delay time of the recording data for R-ch with respect to L-ch according to the time difference T2. The splice recording is made based on the corrected delay time. After a point of the splice recording, the delay time of recording data for R-ch can be corrected by a period Tm with respect to L-ch, as shown in FIG. 24(b), and thereby this embodiment can make recording positions of synchronizing signals for both R-ch and L-ch in alignment with respect to each other before and after the point of splice recording.

Description is given next of a tracking operation when the splice-recorded tape is replayed. Prior to the point of splice recording, sync-signal time difference enhancing circuit 125 is provided only with an output of tracking divergent component ΔTa, in the same manner as in the case of the pre-rolling operation, on which consideration has been given of the thermal expansion of rotary drum 1, as discussed above, and capstan motor 2 is thus controlled based on this data. Following the point of splice recording, a recording/reproducing time difference output by tracking time difference correction detector 126 during the reproducing operation is zero, because the timing distance over four synchronizing signals becomes T0+Tx due to the thermal expansion of rotary drum 1. In addition, a synchronizing signal time difference output by sync-signal time difference detector 7 is Tm+ΔTa. Target tracking time difference calculator 203 inside tracking time difference detector 118 obtains value Tm as target tracking time difference T2, and target tracking time difference T1 is also equal to value Tm. As a result, an output of subtracter 121 becomes ΔTa, which can therefore realize stable tracking control based on accurate tracking error data following the point of splice recording in the same way as that before the point of splice recording.

In the seventh exemplary embodiment, although the description was provided of the operation of splice recording in the case of thermal expansion of the rotary drum caused by temperature changes, the embodied structure has a similar effect of correction even if an expansion or contraction of the tape occurs at the same time due to changes in temperature and humidity.

INDUSTRIAL APPLICABILITY

According to the present invention, as described above, accurate tracking error data can be detected with hardly any influence by jitter and off-centered shaft of the rotary drum. Use of this tracking error data can thus provide the magnetic recording/reproducing apparatus with capability of performing highly accurate tracking. This invention provides for considerable advantages especially of any magnetic recording/reproducing apparatus equipped with a small and light-weight rotary drum.

In addition, the invention can realize stable tracking performance even if there are variations in mounting of heads, changes of mounted positions of the heads due to temperature change, changes in track positions on a tape due to temperature and humidity change, and so on.

The invention claimed is:

1. A magnetic recording and reproducing apparatus comprising:
    a rotary drum including first and second heads having azimuth angles different from each other and arranged along a periphery of said rotary drum, for recording data in a track oblique to a longitudinal direction of a magnetic tape, and for reproducing the data on said track, said first and second heads not being close to each other;
    a sync-signal generator for generating a recording synchronizing signal to be recorded on said magnetic tape, and for outputting said recording synchronizing signal to said first and second heads;
    a sync-signal time difference detector for detecting a time difference between reproduced synchronizing signals reproduced from said magnetic tape and output from said first and second heads, respectively; and
    a capstan-motor controller for controlling rotation of a capstan motor advancing said magnetic tape based on said time difference output from said sync-signal time difference detector,
    wherein said sync-signal generator outputs said recording synchronizing signal to said first and second heads substantially simultaneously, and
    wherein said sync-signal time difference detector includes a target tracking time difference detector for calculating a target synchronizing signal time difference between the reproduced synchronizing signals if a number of the reproduced synchronizing signals is equal to a predetermined number or more, or if an error rate is equal to a predetermined level or less.

2. The magnetic recording and reproducing apparatus according to claim 1,
    wherein said sync-signal generator outputs a recording synchronizing signal for each of "n" number of sync-blocks formed by dividing said track into "n" ("n" represents an integer of 1 or larger), and
    wherein said first and second heads are arranged along said periphery by a distance generally equal to an integral multiple of a length of each of said sync blocks of said track on said magnetic tape.

* * * * *